(12) United States Patent
Liu

(10) Patent No.: US 11,922,969 B2
(45) Date of Patent: *Mar. 5, 2024

(54) SPEECH EMOTION DETECTION METHOD AND APPARATUS, COMPUTER DEVICE, AND STORAGE MEDIUM

(71) Applicant: Tencent Technology (Shenzhen) Company Limited, Shenzhen (CN)

(72) Inventor: Haibo Liu, Shenzhen (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/497,298

(22) Filed: Oct. 8, 2021

(65) Prior Publication Data
US 2022/0028415 A1     Jan. 27, 2022

Related U.S. Application Data

(63) Continuation of application No. 16/600,094, filed on Oct. 11, 2019, now Pat. No. 11,189,302, which is a (Continued)

(30) Foreign Application Priority Data

Aug. 22, 2017  (CN) .......................... 201710725390.2

(51) Int. Cl.
*G10L 25/63*     (2013.01)
*G06N 3/044*     (2023.01)
(Continued)

(52) U.S. Cl.
CPC .............. *G10L 25/63* (2013.01); *G06N 3/044* (2023.01); *G06N 3/08* (2013.01); *G10L 15/02* (2013.01);
(Continued)

(58) Field of Classification Search
CPC ....... G10L 25/63; G10L 15/02; G10L 15/063; G10L 15/16; G10L 15/22; G10L 15/30; G10L 25/78; G06N 3/0445; G06N 3/08
See application file for complete search history.

(56) References Cited

U.S. PATENT DOCUMENTS 6,353,810 B1 *   3/2002   Petrushin ................ G10L 17/26
                                                              704/236
8,543,402 B1     9/2013   Ma
                          (Continued)

FOREIGN PATENT DOCUMENTS

CN     101226742 A     7/2008
CN     101506874 A     8/2009
                       (Continued)

OTHER PUBLICATIONS

Jinkyu Lee and Ivan Tashev; "High-level Feature Representation using Recurrent Neural Network for Speech Emotion Recognition", Interspeech 2015; Sep. 2015; pp. 1537-1540 (Year: 2015).*
(Continued)

*Primary Examiner* — Bhavesh M Mehta
*Assistant Examiner* — Darioush Agahi
(74) *Attorney, Agent, or Firm* — Crowell & Moring LLP

(57) ABSTRACT

A speech emotion detection system may obtain to-be-detected speech data. The system may generate speech frames based on framing processing and the to-be-detected speech data. The system may extract speech features corresponding to the speech frames to form a speech feature matrix corresponding to the to-be-detected speech data. The system may input the speech feature matrix to an emotion state probability detection model. The system may generate, based on the speech feature matrix and the emotion state probability detection model, an emotion state probability matrix corresponding to the to-be-detected speech data. The system may input the emotion state probability matrix and
(Continued)

the speech feature matrix to an emotion state transition model. The system may generate an emotion state sequence based on the emotional state probability matrix, the speech feature matrix, and the emotional state transition model. The system may determine an emotion state based on the emotion state sequence.

18 Claims, 15 Drawing Sheets

Related U.S. Application Data continuation of application No. PCT/CN2018/101450, filed on Aug. 21, 2018.

(51) Int. Cl.
| | | |
|---|---|---|
| *G06N 3/08* | (2023.01) | |
| *G10L 15/02* | (2006.01) | |
| *G10L 15/06* | (2013.01) | |
| *G10L 15/16* | (2006.01) | |
| *G10L 15/22* | (2006.01) | |
| *G10L 15/30* | (2013.01) | |
| *G10L 25/78* | (2013.01) | |

(52) U.S. Cl.
CPC ............ *G10L 15/063* (2013.01); *G10L 15/16* (2013.01); *G10L 15/22* (2013.01); *G10L 15/30* (2013.01); *G10L 25/78* (2013.01)

(56) References Cited

U.S. PATENT DOCUMENTS

| | | | |
|---|---|---|---|
| 2009/0265170 A1* | 10/2009 | Irie | ..................... G10L 17/26 704/236 |
| 2015/0206543 A1 | 7/2015 | Lee | |
| 2017/0069340 A1 | 3/2017 | Nowson et al. | |
| 2019/0043482 A1* | 2/2019 | Li | ..................... G10L 15/02 |
| 2020/0154170 A1* | 5/2020 | Wu | ..................... H04N 21/4532 |

FOREIGN PATENT DOCUMENTS

| | | | |
|---|---|---|---|
| CN | 101685634 | A | 3/2010 |
| CN | 101930735 | A | 12/2010 |
| CN | 101937678 | A | 1/2011 |
| CN | 102142253 | A | 8/2011 |
| CN | 102831184 | A | * 12/2012 |
| CN | 102831184 | A | 12/2012 |
| CN | 102881284 | A | 1/2013 |
| CN | 102890930 | A | 1/2013 |
| CN | 103258531 | A | 8/2013 |
| CN | 103440863 | A | 12/2013 |
| CN | 103531207 | A | 1/2014 |
| CN | 103810994 | A | 5/2014 |
| CN | 106104521 | A | 11/2016 |
| CN | 106683661 | A | 5/2017 |
| CN | 106782602 | A | 5/2017 |
| CN | 106847309 | A | 6/2017 |
| CN | 108346463 | A | 7/2018 |
| EP | 2063416 | A1 | 5/2009 |
| JP | 2005345496 | A | * 12/2005 |
| JP | 2011186521 | A | 9/2011 |
| WO | WO 2017/048730 | A1 | 3/2017 |
| WO | WO 2019/037700 | A1 | 2/2019 |

OTHER PUBLICATIONS

Natarajan et al., "Automated stopping Criteria for Neural Network Training", Proceeding of the American Control Conference, Jun. 1997, New Mexico, pp. 2409-2413 (Year: 1997).*
CN102831184A—Translation (Year: 2012).*
JP2005345496A—Translation (Year: 2004).*
European Office Action for European Patent Application No. 18847495.1 dated May 2, 2022, 4 pages.
Jinkyu Lee et al: "High-level Feature Representation using Recurrent Neural Network for Speech Emotion Recognition", Interspeech 2015, Jul. 1, 2015 (Jul. 1, 2015), XP055406544, Retrieved from the Internet: URL:https://www.microsoft.com/en-us/research/wp-content/uploads/2016/02/Lee-Tashev_Emotion_detection_Interspeech2015.pdf [retrieved on Sep. 14, 2017].
International Search Report of International Patent Application No. PCT/CN2018/101450 dated Nov. 23, 2018, pp. 1-3.
You, Mingyu, "Research on Key Techniques of Speech Emotion Recognition", Doctoral Dissertation Database: Information technology, vol. 7, dated Jul. 15, 2008, 163 pages.
Yu, Dongmei, "Research on Key Technology of Affective Computing", Doctoral Dissertation Database: Informational technology, vol. 12, dated Dec. 15, 2010, 158 pages.
Office Action dated Mar. 30, 2020 for Chinese Application No. 01710725390.2 with concise English Translation, 7 pages.
Non-final Office Action dated Dec. 21, 2020 for Japanese Application No. 2020-509039.
Jinkyu Lee et al.; "High-Level Feature Representation Using Recurrent Neural Network for Speech Emotion Recognition", Interspeech 2015; Sep. 2015; pp. 1537-1540.
Longfei Li et al.; "Hybrid Deep Neural Network—Hidden Markov Model (DNN-HMM) Based Speech Emotion Recognition", 2013 Humaine Association Conference on Affective Computing and Intelligent Interaction; Sep. 2, 2013; pp. 312-317.
Natarajan et al., "Automated stopping Criteria for Neural Network Training", Jun. 1997, Proceeding of the American Control, Conference, pp. 2409-2413 (Year: 1997).
Office Action with English Translation of Office Action Summary and Analysis Report for Korean Patent Application No. 10-2019-7030020 dated Apr. 26, 2021; 5 pages.
Examination Report with English Translation for India Application No. 201947045009 dated Apr. 30, 2021; 7 pages.
European Office Action for European Patent Application No. 18847495.1 dated Sep. 6, 2023, 8 pages.

* cited by examiner

SPEECH EMOTION DETECTION METHOD AND APPARATUS, COMPUTER DEVICE, AND STORAGE MEDIUM

CROSS REFERENCE TO RELATED APPLICATIONS

This application is a continuation application of U.S. application Ser. No. 16/600,094, filed on Oct. 11, 2019, which is a continuation of International Application PCT/CN2018/101450, filed on Aug. 21, 2018, which claims priority to Chinese Patent Application No. 201710725390.2, filed on Aug. 22, 2017, each of which are incorporated herein by reference in their entireties.

TECHNICAL FIELD

This application relates to the field of machine learning, and in particular, to a speech recognition and artificial intelligence.

BACKGROUND

Traditional approaches to emotion recognition analyze a limited set attributes, such as audio and pitch, to determine emotion information conveyed in speech.

SUMMARY

Aspects of the present disclosure include various methods and apparatuses, and computer storage mediums, and systems By way of introductory example, a first aspect of the present disclosure may include a speech emotion detection method. The method may include obtaining, by a processor, to-be-detected speech data. The method may further include generating speech frames based on framing processing and the to-be-detected speech data. The method may further include extracting speech features corresponding to the speech frames to form a speech feature matrix corresponding to the to-be-detected speech data. The method may further include inputting the speech feature matrix to an emotion state probability detection model. The method may further include generating, based on the speech feature matrix and the emotion state probability detection model, an emotion state probability matrix corresponding to the to-be-detected speech data. The method may further include inputting the emotion state probability matrix and the speech feature matrix to an emotion state transition model. The method may further include generating, based on the emotional state probability matrix, the speech feature matrix, and the emotional state transition model, an emotion state sequence corresponding to the to-be-detected speech data. The method may further include determining, based on the emotion state sequence, an emotion state corresponding to the to-be-detected speech data.

A second aspect of the present disclosure may include a speech emotion detection system. The system may obtain to-be-detected speech data. The system may generate, based on framing processing and the to-be-detected speech data, speech frames. The system may extract speech features corresponding to the speech frames to form a speech feature matrix corresponding to the to-be-detected speech data. The system may input the speech feature matrix to an emotion state probability detection model. The system may generate, based on the speech feature matrix and the emotion state probability detection model, an emotion state probability matrix corresponding to the to-be-detected speech data. The system may input the emotion state probability matrix and the speech feature matrix to an emotion state transition model. The system may generate, based on the emotional state probability matrix, the speech feature matrix, and the emotional state transition model, an emotion state sequence corresponding to the to-be-detected speech data. The system may determine, based on the emotion state sequence, an emotion state corresponding to the to-be-detected speech data.

A third aspect of the present disclosure may include a non-transitory computer readable storage medium. The computer readable storage medium may instructions executable by a processor to obtain to-be-detected speech data; generate, based on framing processing and the to-be-detected speech data, speech frames; extract speech features corresponding to the speech frames to form a speech feature matrix corresponding to the to-be-detected speech data; input the speech feature matrix to an emotion state probability detection model; generate, based on the speech feature matrix and the emotion state probability detection model, an emotion state probability matrix corresponding to the to-be-detected speech data; input the emotion state probability matrix and the speech feature matrix to an emotion state transition model; generate, based on the emotional state probability matrix, the speech feature matrix, and the emotional state transition model, an emotion state sequence corresponding to the to-be-detected speech data; and determine, based on the emotion state sequence, an emotion state corresponding to the to-be-detected speech data.

Additional or alternative aspects and technical advancements are provided in the present disclosure.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

While various embodiments are described herein, it will be apparent to those of ordinary skill in the art that many more embodiments and implementations are possible. Accordingly, the embodiments described herein are examples, not the only possible embodiments and implementations.

Figure 1A:
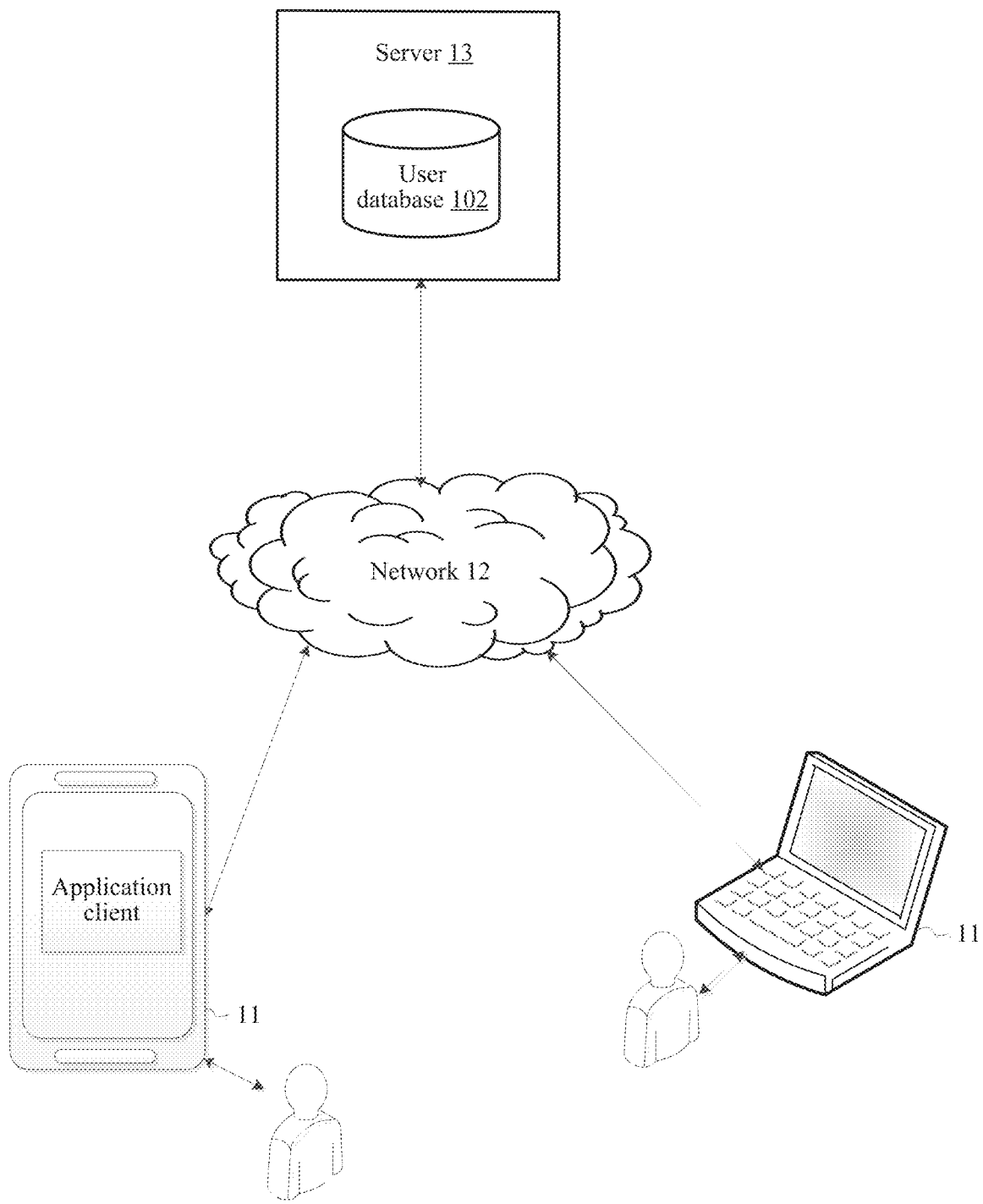
FIG. 1A is a system architecture diagram to which a speech emotion detection method applied in an embodiment.

FIG. 1A displays a system architecture diagram to which a speech emotion detection method described in some embodiments of this application is applied. As shown in FIG. 1A, the system architecture diagram of the speech emotion detection method described in some embodiments of this application includes at least: a terminal 11, a network 12, and a server 13. In addition, the system architecture diagram of the speech emotion detection method described in some embodiments of this application may further include: a user database 14.

In some embodiments of this application, the terminal 11 may refer to a smart device having a data computing and processing function, including but not limited to, a smartphone (installed with a communications logical component), a palmtop computer, a tablet computer, a personal computer, and the like. The device terminal 11 is installed with an operating system, including but not limited to, an Android operating system, a Symbian operating system, a Windows mobile operating system, an Apple iPhone OS operating system, and the like. The device terminal 11 is installed with various application clients, such as an application client that may acquire speech data.

The network 12 may include a wired network and a wireless network. As shown in FIG. 1A, on a side of an access network, the terminal 11 may access the network 12 in a wireless or wired manner; and on a side of a core network, the server 13 is generally connected to the network 12 in a wired manner. Certainly, the server 13 may alternatively be connected to the network 12 in a wireless manner.

The server 13 may be a server of an application client, and is mainly configured to receive speech data acquired by the application client, and perform speech emotion detection based on the speech data. The server 13 may be an independent server or a server cluster including a plurality of servers.

The server 13 may further include a user database 14, configured to store speech data or the like acquired by users.

Figure 1B:
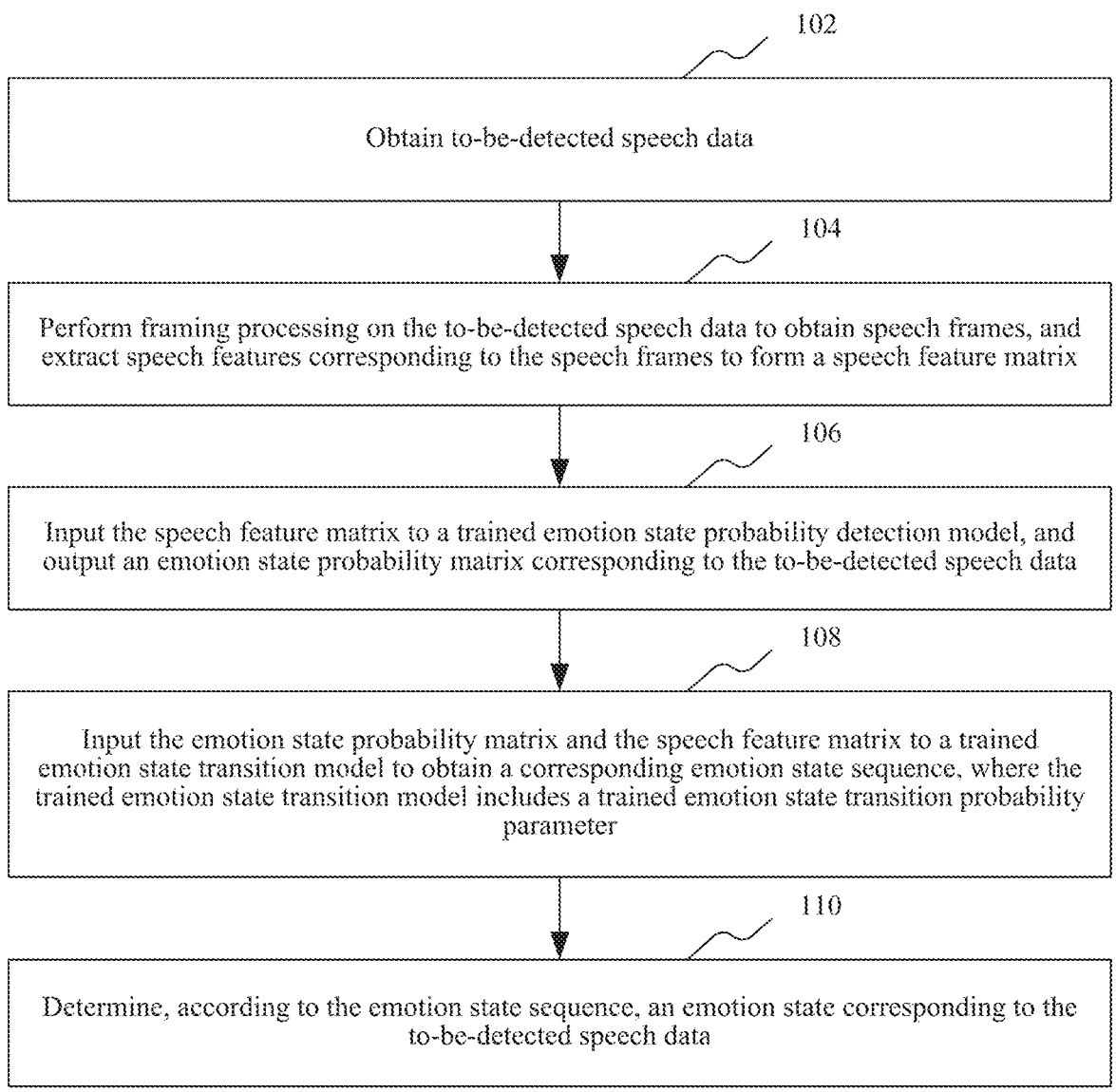
FIG. 1B is a flowchart of a speech emotion detection method in an embodiment.

As shown in FIG. 1B, in an embodiment, based on the foregoing system architecture diagram, an embodiment of this application provides a speech emotion detection method. The method may be performed by a computing device. The computing device may be a server or a terminal. The method specifically includes the following steps:

Step 102. Obtain to-be-detected speech data.

The speech data refers to data recorded through speech and data transferred through speech. For example, the speech data may be sound made by human or animals, a song file, and the like. The to-be-detected speech data may be obtained in real time, or may be pre-stored. For example, speech data input by users may be obtained in real time by using an interactive application, or to-be-detected speech data may be pre-stored in a database, and then, the to-be-detected speech data is obtained from the database.

Step 104. Perform framing processing on the to-be-detected speech data to obtain speech frames, and extract speech features corresponding to the speech frames to form a speech feature matrix.

The framing processing refers to performing segmentation processing on successive speech data. A frame length may be preset, and usually each frame length is set to about 20 ms to 30 ms. Within the interval, a speech signal may be seen as a steady signal. Because only steady information can be processed, before the speech data is processed, the speech data needs to be segmented according to the preset frame length to obtain speech frames. The speech feature can reflect an emotion feature of a speaker, and by extracting the speech feature, corresponding emotion detection can be performed subsequently according to the speech feature. Specifically, after framing processing is performed on the speech data to obtain the speech frames, speech features corresponding to all the speech frames are extracted. There may be many types of extracted speech features, for example, a Melfrequency cepstrum coefficient (MFCC) feature, a filter bank feature, a PITCH feature, a perceptual linear predictive (PLP) feature, an ENERGY feature, and an identifying vector (I-VECTOR) feature. A specific used feature may be freely selected according to an actual situation, and may be one of the foregoing speech features, or may be an integration of various speech features.

The speech feature matrix is formed by combining the speech features corresponding to the speech frames. A speech feature corresponding to each speech frame is a multi-dimensional feature vector. For example, assuming that an extracted speech feature corresponding to each speech frame includes M feature parameters, the speech feature corresponding to each speech frame is an M-dimensional feature vector. Specifically, after the speech features corresponding to all speech frames are extracted, the speech features corresponding to the speech frames are combined according to a sequential order of the speech frames to form a speech feature matrix. Assuming that the to-be-detected speech data includes a total of N speech frames, and each speech feature is an M-dimensional feature vector, the obtained speech feature matrix may be represented as an N*M matrix.

Step 106. Input the speech feature matrix to a trained emotion state probability detection model, and output an emotion state probability matrix corresponding to the to-be-detected speech data.

The emotion state probability detection model is used for predicting emotion state probabilities corresponding to the speech features. The emotion state probabilities refer to a probability distribution of emotion states corresponding to the speech features. Assuming that there are a total of three types of emotion states, which are happy, unhappy, and normal respectively, the emotion state probabilities corresponding to the speech features include a probability that the emotion state is happy, a probability that the emotion state is unhappy, and a probability that the emotion state is normal. A sum of the happy probability, the unhappy probability, and the normal probability is 1. That is, it is assumed that a speech feature corresponds to a happy probability a1, an unhappy probability a2, and a normal probability a3, it meets that a1+a2+a3=1, and values of a1, a2, and a3 range from 0 to 1. It should be noted that, according to actual situations, types of the emotion states may be freely set. For example, in an embodiment, the emotion states include six types: sad, angry, surprised, scared, happy, and disgusted. Specifically, the speech feature matrix is formed by the speech features corresponding to the speech frames, and the corresponding emotion state probability matrix is formed by combining the emotion state probabilities corresponding to the speech features. Assuming that there are a total of N speech frames and K emotion states, the emotion state probability matrix may be represented as an N*K matrix.

Step 108. Input the emotion state probability matrix and the speech feature matrix to a trained emotion state transition model to obtain a corresponding emotion state sequence, where the trained emotion state transition model includes a trained emotion state transition probability parameter.

The trained emotion state transition model is used for predicting the emotion state sequence corresponding to the speech feature matrix (speech feature sequence). The emotion state transition probability parameter records a probability of transition between emotion states. Because the speech feature matrix is a speech feature sequence formed by speech features, each speech feature has a corresponding emotion state probability, and the emotion state transition probability parameter records the probability of transition between emotion states, when the speech feature matrix is determined, the effect of the emotion state transition model is to find the emotion state sequence matching the speech feature matrix. The emotion state sequence records emotion states corresponding to all speech features. The emotion state sequence and the speech feature sequence are associated with each other. The speech feature sequence is a sequence that may be directly observed, and the emotion state sequence is a sequence speculated according to the speech feature sequence. The emotion state sequence reflects an emotion state of to-be-recognized speech data. Because in actual application, transition between emotion states is limited. For example, when the three types of emotions: happy, unhappy, and normal, are recognized, the happy emotion generally cannot directly skip to the unhappy emotion, and the normal emotion between the happy emotion and the unhappy emotion is needed as a transition. If types that need to be recognized gradually increase, such situation will increase. Therefore, by using the emotion state transition probability parameter obtained through training in the emotion state transition model, the emotion state sequence corresponding to the speech feature matrix can be obtained more accurately, and the emotion state of the to-be-detected speech data can be detected more accurately.

Step 110. Determine, according to the emotion state sequence, an emotion state corresponding to the to-be-detected speech data.

The emotion state sequence reflects the emotion state of the to-be-recognized speech data. Therefore, the emotion state sequence may be analyzed to obtain the emotion state corresponding to the to-be-detected speech data. It is assumed that in an embodiment, the emotion state sequence is: 1, 1, 1, 1, 3, 3, 3, 2, 1, 1, and 1, where 1 represents happy, 2 represents unhappy, and 3 represents normal. A smooth operation (removing abnormal data 2) may be performed on data in the emotion state sequence to determine that the entire emotion state corresponding to the emotion state sequence is happy.

In the foregoing speech emotion detection method, first, a speech feature matrix is input to a trained emotion state probability detection model, to obtain an emotion state probability matrix corresponding to to-be-detected speech data. Because transition between emotion states is limited, to recognize an emotion state corresponding to the to-be-detected speech data more accurately, the emotion state probability matrix and the speech feature matrix are input to a trained emotion state transition model. The model includes an emotion state transition probability parameter obtained through training. The emotion state transition probability parameter can accurately reflect the transition between emotion states. By using the emotion state probability matrix and the emotion state transition probability parameter, an emotion state sequence corresponding to the to-be-detected speech data can be obtained more accurately, to further accurately determine a corresponding emotion state. By combining the emotion state probability detection model and the emotion state transition model, not only emotion state probabilities can be fully reflected, but also a probability of the transition between emotion states is considered, thereby greatly improving speech emotion detection accuracy.

Figure 2:
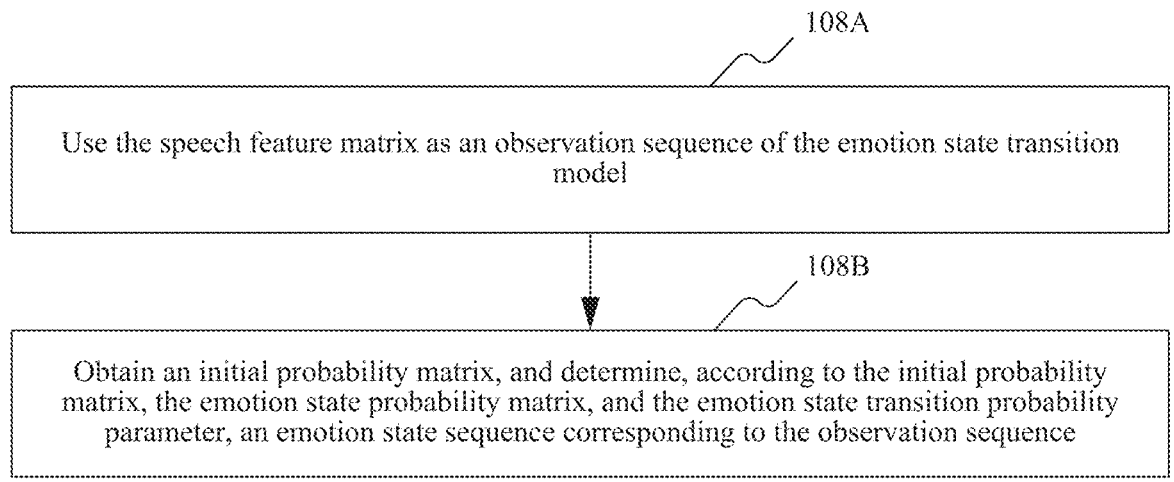
FIG. 2 is a flowchart of a method for determining an emotion state sequence in an embodiment.

As shown in FIG. 2, in an embodiment, step 108 of inputting the emotion state probability matrix and the speech feature matrix to a trained emotion state transition model to obtain a corresponding emotion state sequence, where the trained emotion state transition model includes a trained emotion state transition probability parameter includes:

Step 108A. Use the speech feature matrix as an observation sequence of the emotion state transition model.

The observation sequence refers to a known sequence that may be directly observed. Because the speech feature may be directly extracted, the speech feature matrix is used as a sequence that may be directly observed. The effect of the emotion state transition model is to predict an unknown emotion state sequence according to an observable speech feature matrix (speech feature sequence).

Step 108B. Obtain an initial probability matrix, and determine, according to the initial probability matrix, the emotion state probability matrix, and the emotion state transition probability parameter, an emotion state sequence corresponding to the observation sequence.

The initial probability matrix refers to an initial probability distribution of emotion states. The initial probability matrix may be preset, or may be selected randomly. The emotion state probability matrix records an emotion state probability distribution corresponding to speech features. The emotion state transition probability parameter records a probability of transition between emotion states. In an embodiment, the emotion state transition model may be obtained through training by using a Hidden Markov Model (HMM) model. The HMI model may be described by using a quintuple, $\lambda=(\Omega, \Sigma, \pi, A, B)$, where $\Omega$ is a state set, $\Sigma$ is an observation value set, $\pi$ is a probability distribution of an initial state space, A is a state transition matrix unrelated to time, and B is an observation value probability distribution in a given state. When the observation sequence $O=(O_1, O_2, \ldots, O_T)$ and the model parameters $\pi$, A, B are given, the HMI model can obtain an optimal state sequence $S=(q_1, q_2, \ldots, q_T)$ corresponding to the observation sequence through computation. In this embodiment, $\pi$ may be determined by directly obtaining the initial probability matrix, parameter A is the emotion state transition probability parameter obtained through training, and parameter B may be determined by using the emotion state probability matrix. After the model parameters π, A, B are determined, the emotion state sequence corresponding to the observation sequence may be obtained through computation. A specific computing method may be using a Viterbi logic to obtain an optimal emotion state sequence through computation.

In some embodiments, the HMI model may be trained based on a Baum-Welch logic, to obtain the emotion state transition model. That is, when a series of observation values $O=(O_1, O_2, \ldots, O_T)$ are given, the parameters are adjusted to determine a model $\lambda=(\pi a, b)$, to maximize $P(O|\lambda)$.

The idea of Baum-Welch is using a recursive method to locally maximize $P(O|\lambda)$, to further determine the model $\lambda=(\pi, a, b)$. Assuming that when $\xi_t(i, j)=P(O, q_t=i, q_{t+1}=j|\lambda)$ is a probability that the state is i at t moment and is j at t+1 moment when the observation value $O=(O_1, O_2, \ldots, O_T)$ and the model $\lambda$ are given, $\xi_t(i, j)=[\alpha_t(i)a_{ij}b_j(O_{t+1})\beta_{t+1}]/P(O|\lambda)$ may be derived according to the definition of a forward and backward logic. Therefore, the probability that the state is i at t moment is $$\xi_t(i) = P(O, q_t = i | \lambda) = \sum_{j=1}^{N} \xi_t(i, j) = \alpha_t(i)\beta_t(i)P(O | \lambda), \sum_{t=1}^{T-1} \xi_t(i)$$

and is the expectation that state i is transferred, and $$\sum_{t=1}^{T-1} \xi_t(i, j)$$

is the expectation that state i is transferred to state j. In this way, values of π, A, and B may be determined, as follows:

$$\pi_i = \xi_t(i);$$

$$a_{ij} = \sum_{t=1}^{T-1} \xi_t(i, j) / \sum_{t=1}^{T-1} \xi_t(i);$$

$$b_j(k) = \sum_{t=1}^{T-1} \xi_t(i)I(0_t = k) / \sum_{t=1}^{T-1} \xi_t(i).$$

Figure 3:
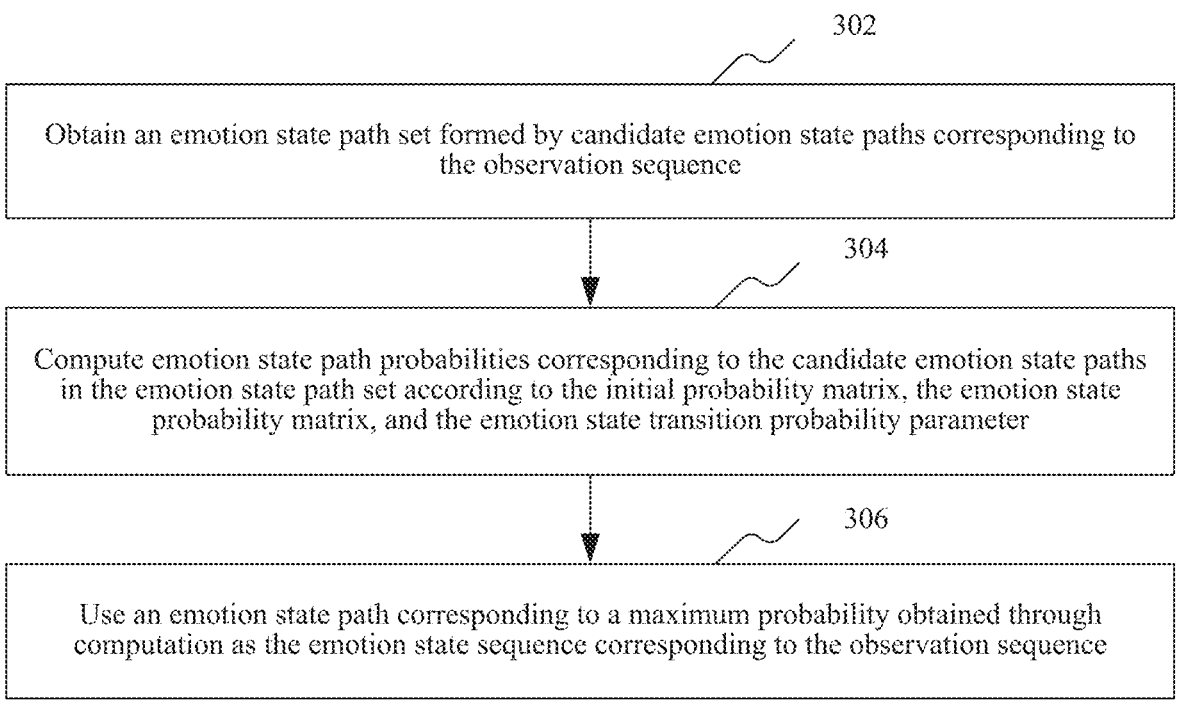
FIG. 3 is a flowchart of a method for determining an emotion state sequence corresponding to an observation sequence in an embodiment.

As shown in FIG. 3, in an embodiment, step 108B of obtaining an initial probability matrix, and determining, according to the initial probability matrix, the emotion state probability matrix, and the emotion state transition probability parameter, an emotion state sequence corresponding to the observation sequence includes:

Step 302. Obtain an emotion state path set formed by candidate emotion state paths corresponding to the observation sequence.

The observation sequence refers to a sequence formed by speech features, each speech feature has a corresponding emotion state probability, and the emotion state probability records probabilities of emotion states corresponding to the speech features. The emotion state path is formed by emotion states. The emotion states in the emotion state path and the speech features in the speech feature sequence are in a one-to-one correspondence. Assuming that the speech feature sequence includes a total of N speech features, the emotion state path is correspondingly formed by N emotion states. Because each speech feature may correspond to a plurality of types of emotion states, there may be a plurality of types of emotion state paths. It is assumed that there are a total of m emotion states, and each speech feature has a probability for each emotion state, that is, each speech feature corresponds to m possible emotion states. Therefore, if there are N speech features, there are $m^N$ candidate emotion state paths theoretically, and all candidate emotion state paths corresponding to the observation sequence are obtained to form the emotion state path set.

Step 304. Compute emotion state path probabilities corresponding to the candidate emotion state paths in the emotion state path set according to the initial probability matrix, the emotion state probability matrix, and the emotion state transition probability parameter.

When the initial probability matrix, the emotion state probability matrix, and the emotion state transition probability parameter are known, the emotion state path probabilities corresponding to the candidate emotion state paths in the candidate emotion state path set are computed, to subsequently determine corresponding emotion state sequences according to the emotion state probabilities corresponding to the candidate emotion state paths. The emotion state probabilities corresponding to the candidate emotion paths may be referred to a transition probability. The transition probability may represent a probability of transition between a first emotion state and a second emotion state. As a simple example, it is assumed that there are a total of three speech features, and three types of (happy, unhappy, and normal) emotion states corresponding to each speech feature, and each speech feature corresponds to a known emotion state. As shown in Table 1, an emotion state probability corresponding to a first speech feature is: happy 0.8, unhappy 0.1, and normal 0.1; an emotion state probability corresponding to a second speech feature is: happy 0.5, unhappy 0.3, and normal 0.2; and an emotion state probability corresponding to a third speech feature is: happy 0.2, unhappy 0.3, and normal 0.5.

TABLE 1

| Speech feature | Happy | Unhappy | Normal |
|---|---|---|---|
| 1 | 0.8 | 0.1 | 0.1 |
| 2 | 0.5 | 0.3 | 0.2 |
| 3 | 0.2 | 0.3 | 0.5 |

It is assumed that probabilities of transitions between emotion states are: happy to happy is 0.6, happy to normal is 0.3, happy to unhappy is 0.1; normal to normal is 0.4, normal to happy is 0.3, normal to unhappy is 0.3; unhappy to unhappy is 0.4, unhappy to normal is 0.4, and unhappy to happy is 0.2, as shown in Table 2.

TABLE 2

|  | Happy | Unhappy | Normal |
|---|---|---|---|
| Happy | 0.6 | 0.1 | 0.3 |
| Normal | 0.3 | 0.3 | 0.4 |
| Unhappy | 0.2 | 0.4 | 0.4 |

Now, the known speech feature sequence is 1, 2, and 3, and correspondingly, there are 27 candidate emotion state paths. One of the candidate emotion state paths is: happy-normal-unhappy, and an emotion state path probability corresponding to the candidate emotion state path is computed. It is assumed that an initial state probability is: happy is 0.3, normal is 0.5, and unhappy is 0.2.

A specific computing method is: P=P0(initial-happy)*P1 (happy)*P(happy-normal)*P2(normal)*P(normal-unhappy) *P3(unhappy), where P0(initial-happy) represents a probability that an initial emotion state is happy; P1(happy) represents a probability that a first frame is happy, P(happy-normal) represents a probability of an emotion state from happy to normal, P2(normal) represents a probability that a second frame is normal, P(normal-unhappy) represents a probability of an emotion state from normal to unhappy, and P3(unhappy) represents a probability that a third frame is unhappy. Therefore, it may be obtained through computation according to the foregoing known data that an emotion state probability corresponding to the emotion state path happy-normal-unhappy is P=0.3*0.8*0.3*0.2*0.3*0.3=0.001296. When a quantity of emotion state paths is relatively small, probabilities corresponding to all candidate state paths may be obtained through computation by using an exhaustive manner. However, when the quantity is relatively large, to obtain an optimal emotion state path more quickly, in an embodiment, a Viterbi logic may be used to perform dynamic path planning to obtain an optimal candidate emotion state path through computation. Specifically, it is assumed that a speech feature sequence used as an observation sequence is $O_1, O_2, \ldots, O_T$, where $t=1, 2, 3, \ldots 1$, and it is defined that $\delta_t(i)$ is an emotion state path along a path $q_1, q_2, \ldots, q_t$ at t moment, and $q_t=i$. A generated maximum probability of $O_1, O_2, \ldots, O_t$ is $$\delta_t(i) = \max_{q_1,q_2,\ldots,q_{t-1}} P(q_1, q_2, \ldots, q_t, q_t = i, O_1, O_2, \ldots, O_t \mid \lambda),$$

where i represents an emotion state. A main process is: (1) initialize $\delta_1(i)=\pi_i b_i(O_1)$, and $\varphi_1(i)=0$;

$$\text{recurse } \delta_t(i) = \max_{1 \leq j \leq N} ([\delta_{t-1}(j)a_{ij}])b_i(o_t), \quad (2)$$

$$\phi_t(i) = \arg\max_{1 \leq j \leq N} [\delta_{t-1}(j)a_{ij}]; \text{ and}$$

$$P = \max_{1 \leq i \leq N} [\delta_T(i)], q_T = \operatorname*{argmax}_{1 \leq i \leq N} [\delta_T(i)], \quad (3)$$

where i represents an emotion state, P is a maximum probability obtained through computation, and $q_T$ is a corresponding optimal candidate emotion state path.

Step 306. Use an emotion state path corresponding to a maximum probability obtained through computation as the emotion state sequence corresponding to the observation sequence.

Specifically, a candidate emotion state path corresponding to the maximum probability obtained through computation is used as the emotion state sequence corresponding to the observation sequence.

Figure 4:
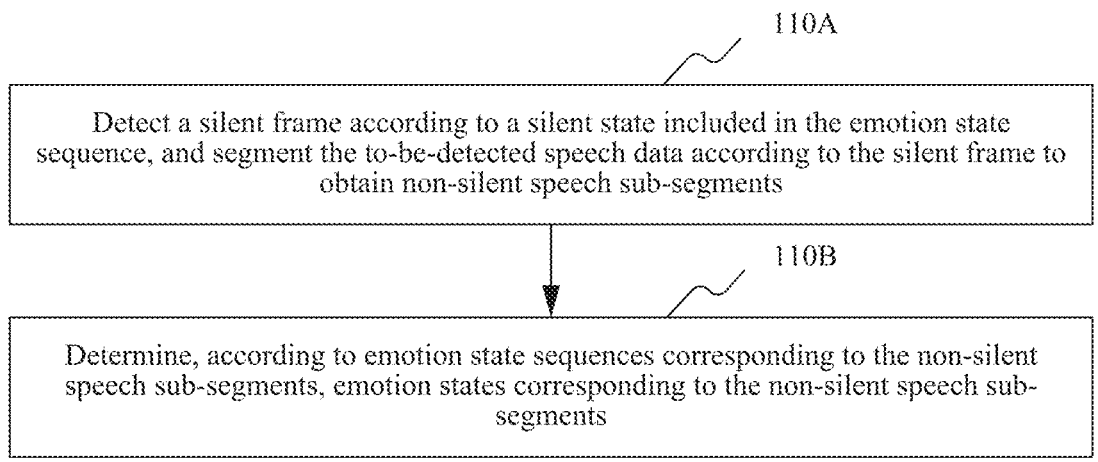
FIG. 4 is a flowchart of a method for determining an emotion state corresponding to to-be-detected speech data in an embodiment.

As shown in FIG. 4, in an embodiment, the emotion state probability includes a silent probability.

Step 110 of determining, according to the emotion state sequence, an emotion state corresponding to the to-be-detected speech data includes:

Step 110A. Detect a silent frame according to a silent state included in the emotion state sequence, and segment the to-be-detected speech data according to the silent frame to obtain non-silent speech sub-segments.

Usually, one segment of speech only includes one emotion, for example, happy. However, in some cases, one segment of speech may also include a plurality of emotions. To detect the emotion of the to-be-detected speech data more accurately, detection may be performed by using a segment detection method. The segmentation is based on silent detection. The silent detection is also referred to as "speech activity detection", and is detecting a non-speech part in a segment of speech data. The non-speech part is a detected silent part. Silent include pause and noise, but are not limited thereto. The to-be-detected speech data is segmented according to the detected non-speech part.

Conventional silent detection is additionally increasing a silent detection logical component to perform silent detection. A conventional silent detection logic is based on energy, it is regarded that high energy is speech, and low energy is noise, namely, non-speech. In this case, there is no way to determining when noise is relatively large, and therefore, the conventional silent detection is not accurate enough. To perform silent detection accurately, a silent type is directly increased in an emotion state detection model training process, that is, the silent type is also seen as an emotion state. In this way, an emotion state detection model obtained through training may not only detect an emotion state, but also perform silent detection, without the need of additionally increasing a silent detection logical component. The operation is convenient, and increasing the silent type can help improve silent detection accuracy. That is, silent is directly seen as an emotion state, and a corresponding obtained emotion state probability further includes a silent probability in addition to probabilities of real emotion states. For example, assuming that there are originally three types of emotion states: happy, unhappy, and normal, now silent is also used as an emotion state, and the four types of emotion states are used to train the emotion state detection model to obtain a model that can also detect a silent state.

Specifically, each speech frame corresponds to a speech feature, each speech feature corresponds to an emotion state, and a silent state corresponds to a silent frame. The emotion state sequence includes a silent state, and a silent frame in the to-be-detected speech data is determined according to the included silent state, to further segment the to-be-detected speech data according to the silent frame. In actual application, the speech data is not segmented whenever a silent frame appears. Instead, the to-be-detected speech data is segmented only when a plurality of successive silent frames is detected. Because a successive non-silent part is usually only one emotion, a situation that the former and latter speech emotions are inconsistent may appear only when a relatively long silent part appears. In an embodiment, whether a quantity of successive silent states appearing in the emotion state sequence exceeds a preset threshold (for example, 10) is determined. If the quantity exceeds the preset threshold, a non-silent part before the silent state is used as a non-silent speech sub-segment, and a non-silent part behind the silent state is used as a non-silent speech sub-segment.

Step 110B. Determine, according to emotion state sequences corresponding to the non-silent speech sub-segments, emotion states corresponding to the non-silent speech sub-segments.

The non-silent speech sub-segment refers to a sub-segment obtained after the silent state in the to-be-processed speech data is segmented. Because the emotion states in the emotion state sequence and the speech features in the speech feature sequence are in a one-to-one correspondence, after the non-silent speech sub-segment is determined, a corresponding emotion state sequence (emotion state sub-sequence) may be directly determined according to a speech feature sequence corresponding to the non-silent speech sub-segment. Then, the emotion state sequence may be analyzed to obtain emotion states corresponding to the non-silent speech sub-segments. Specifically, emotion detection may be performed on the to-be-detected speech data in real time or not in real time. In an embodiment, the to-be-detected speech data is detected in real time. When a silent state meeting a segmentation condition is detected, the to-be-detected speech data is segmented into a former segment and a latter segment according to the silent state, and an emotion state corresponding to the former segment is first determined and output. Then, a silent state in the latter segment continues to be detected. If a silent state meeting the condition appears, the latter segment continues to be segmented, and so on.

Figure 5:
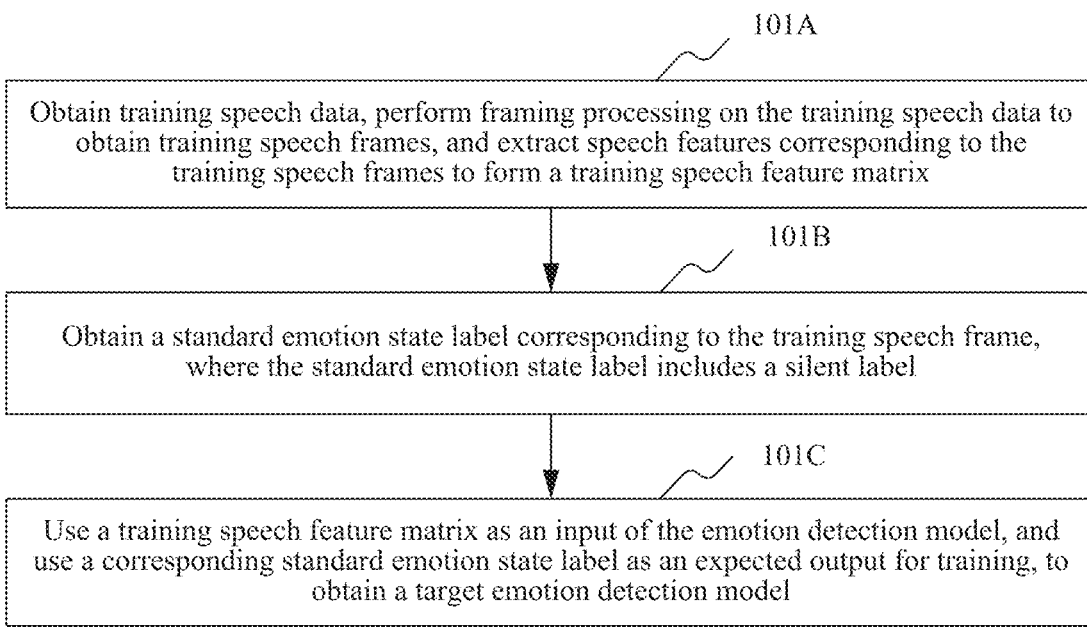
FIG. 5 is a flowchart of a method for establishing an emotion state detection model in an embodiment.

As shown in FIG. 5, in an embodiment, before the step of inputting a speech feature matrix to a trained emotion state probability detection model, and outputting an emotion state probability matrix corresponding to the to-be-detected speech data, the method further includes: step 101. Establish an emotion state probability detection model. The establishing an emotion state probability detection model specifically includes the following steps:

Step 101A. Obtain training speech data, perform framing processing on the training speech data to obtain training speech frames, and extract speech features corresponding to the training speech frames to form a training speech feature matrix.

The training speech data refers to speech data used for training an emotion state probability detection model. First, same as a detection process, framing processing needs to be performed on the training speech data to obtain training speech frames, then, speech features corresponding to all the training speech frames are extracted, and the obtained speech features are combined according to a sequential order of the speech frames to form a training speech feature matrix.

Step 101B. Obtain a standard emotion state label corresponding to the training speech frame, where the standard emotion state label includes a silent label.

The standard emotion state label refers to performing standard emotion labeling on the training speech frame with a known emotion state. To detect the corresponding silent state while detecting the emotion state, the standard emotion state label includes a label for the silent state. In this way, the emotion state probability matrix obtained through training may detect the silent state. Specifically, standard emotion state labeling is performed on each speech frame respectively, and each speech frame has a corresponding speech feature, that is, standard emotion state labeling is performed on the speech feature.

Step 101C. Use a training speech feature matrix as an input of the emotion state probability detection model, and use a corresponding standard emotion state label as an expected output for training, to obtain a final emotion state probability detection model.

Specifically, the training speech feature matrix is used as an input of a to-be-trained emotion state probability detection model, and a standard emotion state label corresponding to each speech feature in the training speech feature matrix is used as a standard output (that is, an expected output) of the corresponding speech feature for training. In a training process, a model parameter of the emotion state probability detection model is continuously adjusted to make an actually output emotion state continuously approach a standard emotion state, until an error therebetween meets the condition and training of the model is completed.

Figure 6:
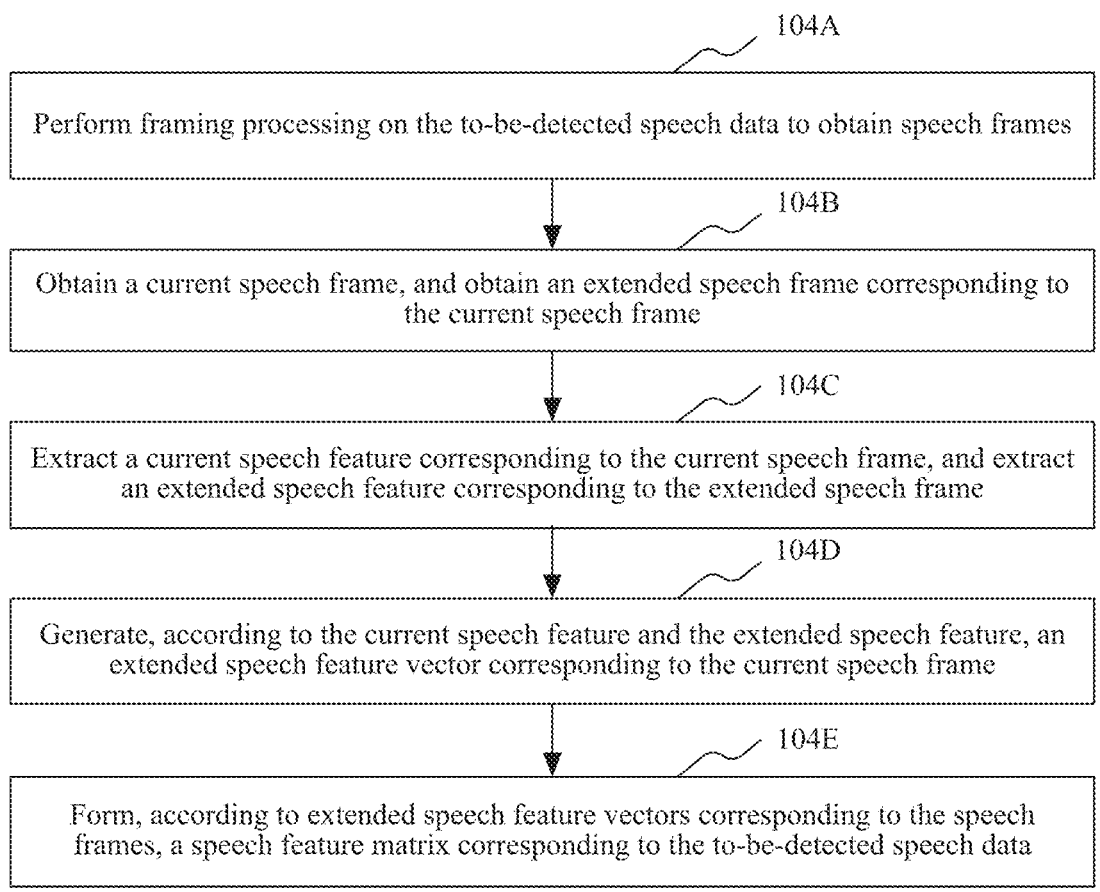
FIG. 6 is a flowchart of a method for extracting speech features corresponding to speech frames to form a speech feature matrix in an embodiment.

As shown in FIG. 6, in an embodiment, step 104 of performing framing processing on the to-be-detected speech data to obtain speech frames, and extracting speech features corresponding to the speech frames to form a speech feature matrix includes:

Step 104A. Perform framing processing on the to-be-detected speech data to obtain speech frames.

Specifically, the framing processing refers to performing segmentation processing on successive speech data, and the to-be-detected speech data is segmented according to a preset frame length to obtain speech frames.

Step 104B. Obtain a current speech frame, and obtain an extended speech frame corresponding to the current speech frame.

Specifically, the emotion is a continuous process. Therefore, if historical and future information can be referenced during the detection, a better speech emotion detection effect can be obtained. Therefore, in addition to obtaining the current speech frame, historical and future speech frames corresponding to the current speech frame may also be obtained, that is, forward and/or backward speech frames corresponding to the current speech frame may be obtained. The obtained forward and/or backward speech frames corresponding to the current speech frame are referred to as "extended speech frames". In an embodiment, a first preset quantity of forward speech frames is obtained from a forward direction of the current speech frame, and a second preset quantity of backward speech frames is obtained from a backward direction of the current speech frame, where both the forward speech frames and the backward speech frames are extended speech frames corresponding to the current speech frame. For example, if M frames of a forward direction and a backward direction neighboring to the current speech frame are extracted respectively, subsequently 2M+1 frames are used as an input. If latitude of each frame is N, an actual input is an N*(2M+1) matrix.

Step 104C. Extract a current speech feature corresponding to the current speech frame, and extract an extended speech feature corresponding to the extended speech frame.

A speech feature corresponding to the current speech frame is extracted as a "current speech feature", and a speech feature corresponding to the extended speech frame is extracted as an "extended speech feature" respectively.

Step 104D. Generate, according to the current speech feature and the extended speech feature, an extended speech feature vector corresponding to the current speech frame.

The speech feature corresponding to the current speech frame is obtained, the extended speech feature corresponding to the extended speech frame is obtained, and the current speech feature and the extended speech feature form a speech feature vector according to a sequential order, which is referred to as an "extended speech feature vector".

Step 104E. Form, according to extended speech feature vectors corresponding to the speech frames, a speech feature matrix corresponding to the to-be-detected speech data.

Each speech feature corresponds to an extended speech feature vector, and the extended speech feature vectors corresponding to the speech frames form a speech feature matrix according to a sequential order. The speech feature matrix is used as an input of the emotion state detection model, and the speech feature matrix is formed by extended speech feature vectors. During the input, the extended speech feature vectors are actually used as an input. Because historical and future information is considered, prediction accuracy of the emotion state probability can be improved.

Figure 7:
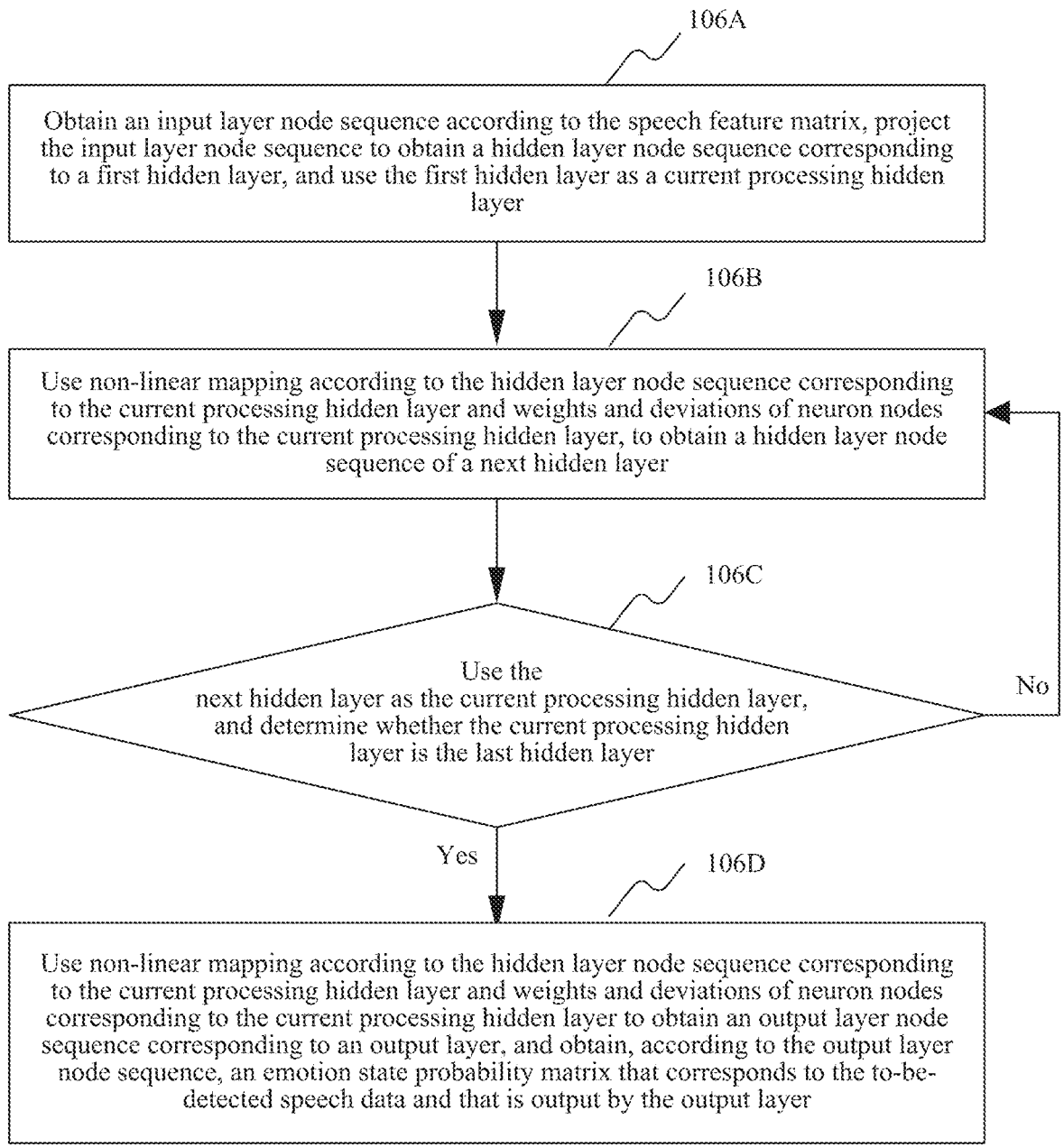
FIG. 7 is a flowchart of a method for inputting a speech feature matrix to a trained emotion state probability detection model, and outputting an emotion state probability matrix corresponding to to-be-detected speech data in an embodiment.

As shown in FIG. 7, in an embodiment, the emotion state detection model is obtained through training by using a DNN model. Step 106 includes: step 106A. Obtain an input layer node sequence according to the speech feature matrix, project the input layer node sequence to obtain a hidden layer node sequence corresponding to a first hidden layer, and use the first hidden layer as a current processing hidden layer.

The emotion state probability detection model is obtained through training by using a DNN model. The DNN model includes an input layer, a hidden layer, and an output layer, where the hidden layer may be plural. The input layer node sequence refers to a sorting order of input parameters input to the input layer, and is a sequence formed according to the speech feature matrix itself. For example, assuming that an N-dimensional speech feature is input, a corresponding input layer node sequence refers to a sequence formed by N input parameters in the N-dimensional speech feature according to an order. The effect of the input layer is to perform projection conversion processing on the input parameters, to obtain a hidden layer node sequence corresponding to the first hidden layer. That is, an output of the input layer is correspondingly used as an input of the first hidden layer. The hidden layer node sequence refers to a sequence of input parameters corresponding to the hidden layer. The first hidden layer is used as a current processing hidden layer, and then, an output of the current processing hidden layer is obtained as an input of a next hidden layer.

Step 106B. Use non-linear mapping according to the hidden layer node sequence corresponding to the current processing hidden layer and weights and deviations of neuron nodes corresponding to the current processing hidden layer, to obtain a hidden layer node sequence of a next hidden layer.

The input layer, the hidden layer, and the output layer are all formed by neurons, and each neuron is used as a neuron node of a corresponding layer. Neurons between neighboring layers are fully connected, that is, any neuron in an $i^{th}$ layer is certainly neighboring to any neuron in an $(i+1)^{th}$ layer. Neuron nodes in each hidden layer and output layer have a corresponding weight and deviation, and the input layer has no weight and deviation. After the hidden layer node sequence corresponding to the current processing hidden layer is obtained, an intermediate value is computed according to the hidden layer node sequence corresponding to the current processing hidden layer and weights and deviations of neuron nodes corresponding to the current processing hidden layer, and then non-linear mapping is used for the obtained intermediate value to obtain the hidden layer node sequence of the next hidden layer. In an embodiment, assuming that an output of a previous layer is z, where $z=f(y_{l-1})$, W is a weight matrix corresponding to the current processing hidden layer, and b is a deviation corresponding to the current processing hidden layer, first, $y_l=W*z+b$ is obtained through computation, and then a non-linear mapping is used to obtain an output of the hidden layer, which is represented as $f(y_l)$, where l represents a quantity of layers. The hidden layer node sequence of the next hidden layer is determined according to the output of the current processing hidden layer.

Step 106C. Use the next hidden layer as the current processing hidden layer, and determine whether the current processing hidden layer is the last hidden layer, if the current processing hidden layer is the last hidden layer, enter step 106D, and if the current processing hidden layer is not the last hidden layer, enter step 106B.

Specifically, the obtained next hidden layer is used as the current processing hidden layer, and whether the current processing hidden layer is the last hidden layer is determined. If the current processing hidden layer is the last hidden layer, non-linear mapping is used according to the hidden layer node sequence corresponding to the current processing hidden layer and the weights and the deviations of the neuron nodes corresponding to the current processing hidden layer to obtain the output layer node sequence corresponding to the output layer through computation. If the current processing hidden layer is not the last hidden layer, non-linear mapping is used according to the hidden layer node sequence corresponding to the current processing hidden layer and the weights and the deviations of the neuron nodes corresponding to the current processing hidden layer to obtain the hidden layer node sequence of the next hidden layer, and so on, until the output layer is reached.

Step 106D. Use non-linear mapping according to the hidden layer node sequence corresponding to the current processing hidden layer and weights and deviations of neuron nodes corresponding to the current processing hidden layer to obtain an output layer node sequence corresponding to an output layer, and obtain, according to the output layer node sequence, an emotion state probability matrix that corresponds to the to-be-detected speech data and that is output by the output layer.

Specifically, non-linear mapping is used according to a hidden layer node sequence corresponding to the last hidden layer and the weights and the deviations of the neuron nodes to obtain the output layer node sequence corresponding to the output layer. That is, an output of the last hidden layer is used as an input of the output layer. Then, the output layer obtains, according to the corresponding output layer node sequence and the weights and the deviations of the neuron nodes corresponding to the output layer and by using non-linear mapping, the emotion state probability matrix corresponding to the to-be-detected speech data through computation.

Figure 8:
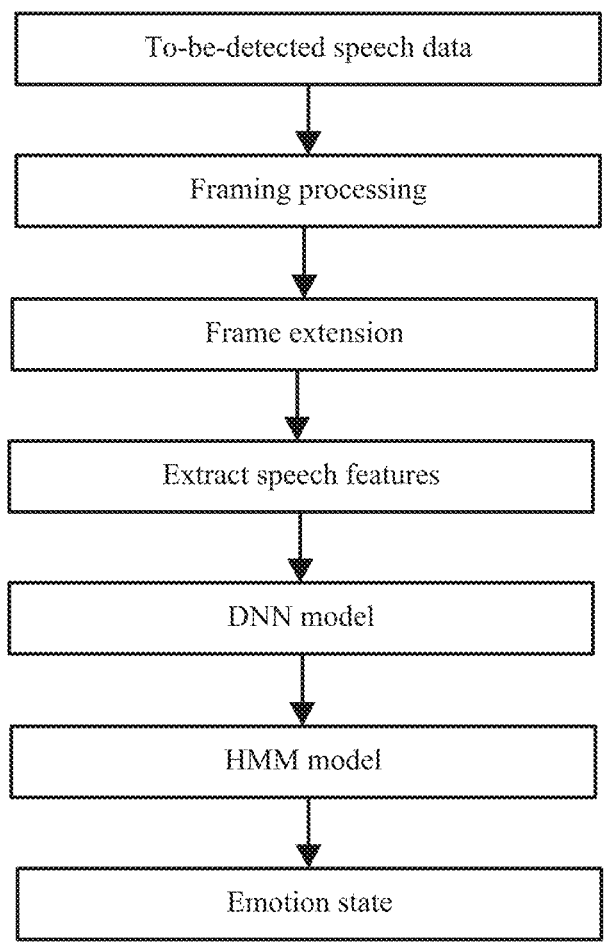
FIG. 8 is a schematic flowchart of performing emotion prediction on to-be-detected speech data in an embodiment.

FIG. 8 is a schematic flowchart of performing emotion state prediction on to-be-detected speech data in an embodiment. First, to-be-detected speech data is obtained, then framing processing is performed on the obtained speech data to obtain speech frames, then, speech features corresponding to the speech frames are extracted, and then, frame extension is performed on the speech frames. Speech features corresponding to the extended speech frames are used as an input of a DNN model (emotion state probability detection model), and emotion state probabilities corresponding to the speech frames are output. Then, the emotion state probabilities and the speech features are used as an input of an HMM model (emotion state transition model) to obtain an output emotion state sequence, and an emotion state corresponding to the to-be-detected speech data is determined according to the emotion state sequence.

Figure 9:
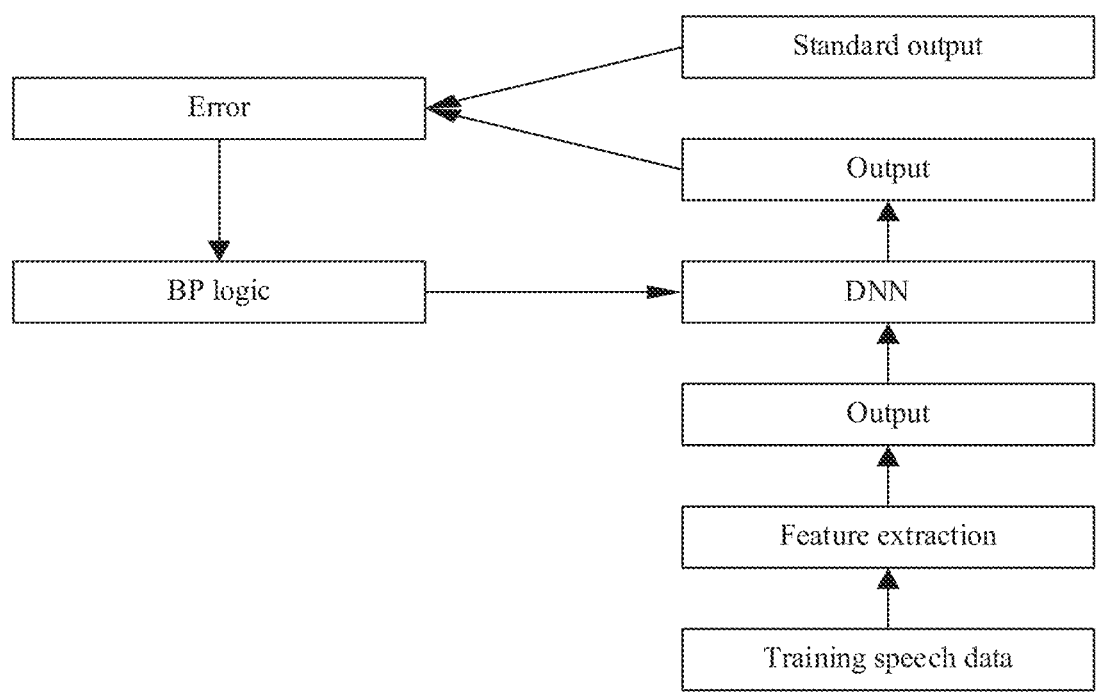
FIG. 9 is a schematic flowchart of obtaining an emotion state detection model through training by using a deep neural network (DNN) model in an embodiment.

In an embodiment, before the step of inputting the speech feature matrix to a trained emotion state probability detection model, and outputting an emotion state probability matrix corresponding to the to-be-detected speech data, the method further includes: obtaining an emotion state probability detection model through training by using the DNN model. FIG. 9 is a schematic flowchart of obtaining an emotion state probability detection model through training by using a DNN model.

A specific training process is as follows: (1) Perform framing on training speech data. The training speech data is obtained, and framing processing is performed on the training speech data to obtain speech frames. (2) Extract speech features corresponding to the speech frames. The extracted features may be an integration of a plurality of types of features, for example, an integration of a plurality of features such as PLP, MFCC, PITCH, and ENERGY. (3) Perform frame extension. The emotion a continuous process, and using historical and future information can obtain a better prediction effect. Therefore, performing frame extension on the speech frames can help improve prediction accuracy. For example, M frames of a forward direction and a backward direction corresponding to a current frame may be used to extend the current frame. Therefore, a corresponding input of the model is actually a feature vector corresponding to 2M+1 frames. (4) Send the extended speech frames to an initial DNN model for training. The speech frames are transferred forward from an input layer, and reaches an output layer after passing through hidden layers. A rule of transferring information between layers in the DNN may be represented as the following form: $y_l = W*z + b$, where l represents a current layer, $z = f(y_{l-1})$ represents an output of a previous layer, W is a weight matrix corresponding to the current layer, and b is a deviation corresponding to the current layer, and then, non-linear mapping is used to obtain an output of the hidden layer, represented as $f(y_l)$. (5) Obtain an output emotion state prediction probability corresponding to a speech feature, compare the emotion state prediction probability with a standard emotion state probability, and compute whether an error therebetween is within a preset range. If the error is within the preset, it indicates that the current DNN model may be used for subsequent prediction, and if the error is not within the preset range, enter step (6) to adjust the model by continuously updating weights and deviations. (6) Update weights and deviations. Specifically, a suitable loss function is selected according to an actual output and a standard output. Usually, a maximum entropy or minimum mean square error function is used as a loss function, and then, a weight and a deviation of the DNN model are updated by using a stochastic gradient descent method. After a plurality of rounds of iterations, the model attains to the optimum. The maximum entropy loss function may be represented as:

$$J_{CE} = -\sum_{c=1}^{C} y_i \log(i \mid o),$$

where $J_{CE}$ represents a maximum entropy loss function, o represents a feature of a current frame, i is an emotion type of the current frame, $y_i$ represents a probability of an output emotion state i, and C represents an emotion category. Partial derivatives are taken for W and b in the loss function, and the stochastic gradient descent method is used to update W and b round by round. A stochastic gradient descent formula is represented as follows: $P_{t+1} = P_t - \eta \Delta P_t$, where $\eta$ represents a learning rate, $P_t$ represents a parameter before the update, $P_{t+1}$ represents an updated parameter, and $\Delta P_t$ represents a value obtained by taking a partial derivative. A back-propagation (BP) logic may be used to update W and b of former different layers layer by layer from the last layer.

Figure 10:
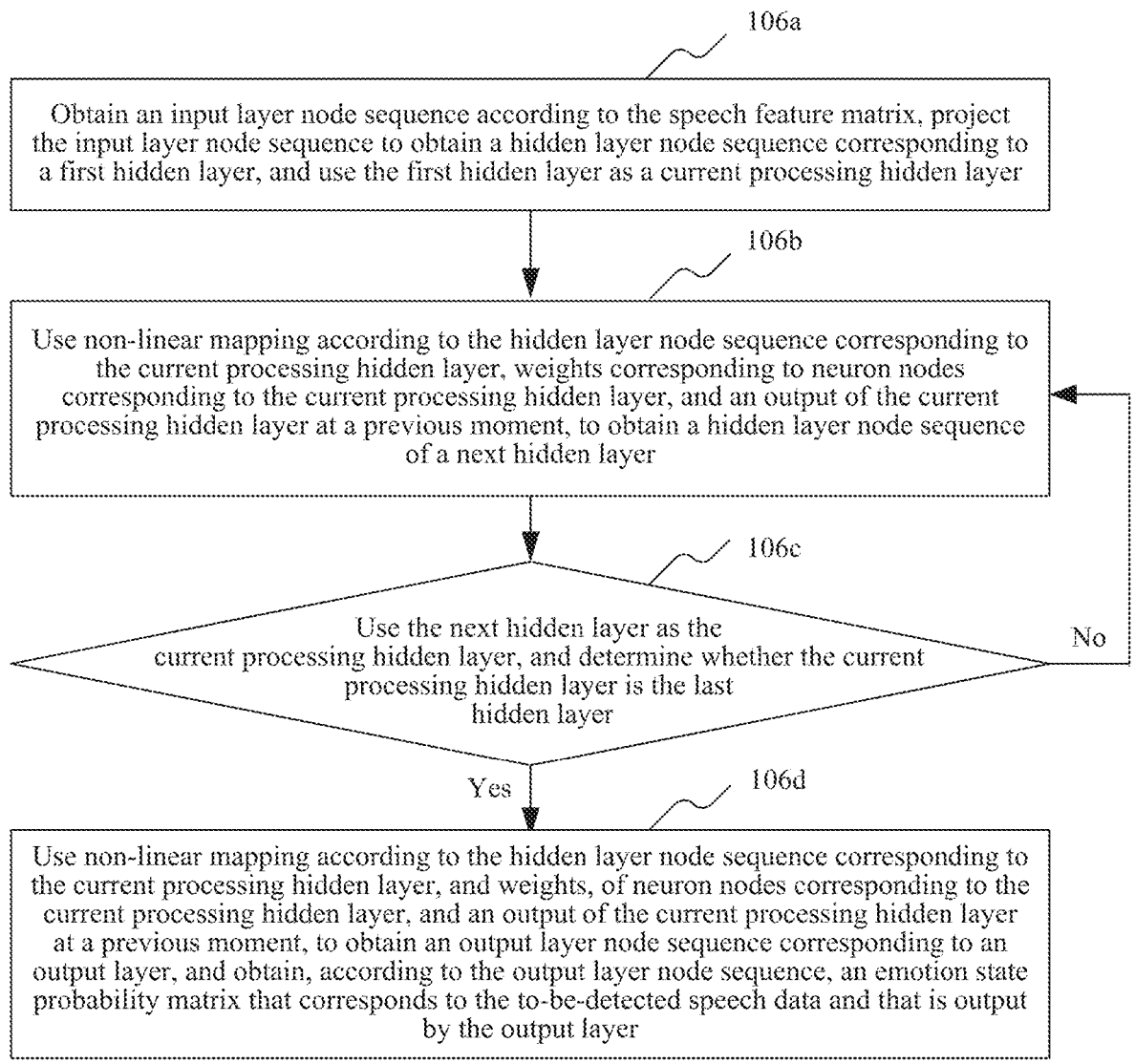
FIG. 10 is a flowchart of a method for inputting a speech feature matrix to a trained emotion state probability detection model, and outputting an emotion state probability matrix corresponding to to-be-detected speech data in another embodiment.

As shown in FIG. 10, in an embodiment, the emotion state probability detection model is obtained through training by using an RNN model; and step 106 of inputting the speech feature matrix to a trained emotion state probability detection model, and outputting an emotion state probability matrix corresponding to the to-be-detected speech data includes:

Step 106a. Obtain an input layer node sequence according to the speech feature matrix, project the input layer node sequence to obtain a hidden layer node sequence corresponding to a first hidden layer, and use the first hidden layer as a current processing hidden layer.

The emotion state detection model is obtained through training by using an RNN model. The RNN model includes an input layer, a hidden layer, and an output layer, where the hidden layer may be plural. The input layer node sequence refers to a sorting order of input parameters input to the input layer, and is a sequence formed according to the speech feature matrix itself. For example, assuming that an N-dimensional speech feature is input, a corresponding input layer node sequence refers to a sequence formed by N input parameters in the N-dimensional speech feature according to an order. The effect of the input layer is to perform projection conversion processing on the input parameters, to obtain a hidden layer node sequence corresponding to the first hidden layer. That is, an output of the input layer is used as an input of the first hidden layer. The hidden layer node sequence refers to a sequence of input parameters corresponding to the hidden layer. The first hidden layer is used as a current processing hidden layer, and then, an output of the current processing hidden layer is obtained as an input of a next hidden layer.

Step 106b. Use non-linear mapping according to the hidden layer node sequence corresponding to the current processing hidden layer, weights corresponding to neuron nodes corresponding to the current processing hidden layer, and an output of the current processing hidden layer at a previous moment, to obtain a hidden layer node sequence of a next hidden layer.

The difference between the RNN and the DNN lies in: In a forward transfer process, not only information about a previous layer is used, but also information of this layer at a previous moment is used, that is, historical information is used. Therefore, compared with the DNN, the RNN has a better prediction effect. The input layer, the hidden layer, and the output layer are all formed by neurons, and each neuron is used as a neuron node of a corresponding layer. Neurons between neighboring layers are fully connected, that is, any neuron in an $i^{th}$ layer is certainly neighboring to any neuron in an $(i+1)^{th}$ layer. Neuron nodes in each hidden layer and output layer have a corresponding weight, and the input layer has no weight. After the hidden layer node sequence corresponding to the current processing hidden layer is obtained, an intermediate value is computed according to the hidden layer node sequence corresponding to the current processing hidden layer, weights of neuron nodes corresponding to the current processing hidden layer, and an output of the current processing hidden layer at a previous moment, and then non-linear mapping is used for the obtained intermediate value to obtain the hidden layer node sequence of the next hidden layer. In a specific embodiment, a rule of transferring information between layers in the RNN may be represented as the following forms:

$$a_h^t = \sum_{i=1}^{I} w_{ih} x_i^t + \sum_{h'=1}^{H} w_{h'h} b_{h'}^{t-1}$$

and $b_h^t = f(a_h^t)$, where $a_h^t$ is a value of a unit at a current layer h at t moment, I is a total quantity of previous layer neuron nodes, that is, a total quantity of the current layer input parameters, H is a total quantity of neuron nodes in the current layer, $w_{ih}$ is a weight from unit i to unit h, $w_{h'h}$ is a weight from unit h' to unit h, and $b_{h'}^{t-1}$ represents an output of the current layer at the previous moment. $b_h^t$ is a value after an excitation function (non-linear mapping) is performed on $a_h^t$.

Step 106c. Use the next hidden layer as the current processing hidden layer, and determine whether the current processing hidden layer is the last hidden layer, if the current processing hidden layer is the last hidden layer, enter step 106d, and if the current processing hidden layer is not the last hidden layer, enter step 106b.

Specifically, the obtained next hidden layer is used as the current processing hidden layer, and whether the current processing hidden layer is the last hidden layer is determined. If the current processing hidden layer is the last hidden layer, non-linear mapping is used according to the hidden layer node sequence corresponding to the current processing hidden layer, the weights of the neuron nodes corresponding to the current processing hidden layer, and the output of the current processing hidden layer at the previous moment, to obtain the output layer node sequence corresponding to the output layer through computation. If the current processing hidden layer is not the last hidden layer, non-linear mapping is used according to the hidden layer node sequence corresponding to the current processing hidden layer, the weights, of the neuron nodes corresponding to the current processing hidden layer, and the output of the current processing hidden layer at the previous moment, to obtain the hidden layer node sequence of the next hidden layer, and so on, until the output layer is reached.

Step 106d. Use non-linear mapping according to the hidden layer node sequence corresponding to the current processing hidden layer, and weights, of neuron nodes corresponding to the current processing hidden layer, and an output of the current processing hidden layer at a previous moment, to obtain an output layer node sequence corresponding to an output layer, and obtain, according to the output layer node sequence, an emotion state probability matrix that corresponds to the to-be-detected speech data and that is output by the output layer.

Specifically, non-linear mapping is used according to a hidden layer node sequence corresponding to the last hidden layer, the weights of the neuron nodes, and the output of the current processing hidden layer at the previous moment, to obtain the output layer node sequence corresponding to the output layer. That is, an output of the last hidden layer is used as an input of the output layer. Then, the output layer obtains, according to the corresponding output layer node sequence, the weights of the neuron nodes corresponding to the output layer, and the output of the output layer at the previous moment and by using non-linear mapping, the emotion state probability matrix corresponding to the to-be-detected speech data through computation.

Figure 11:
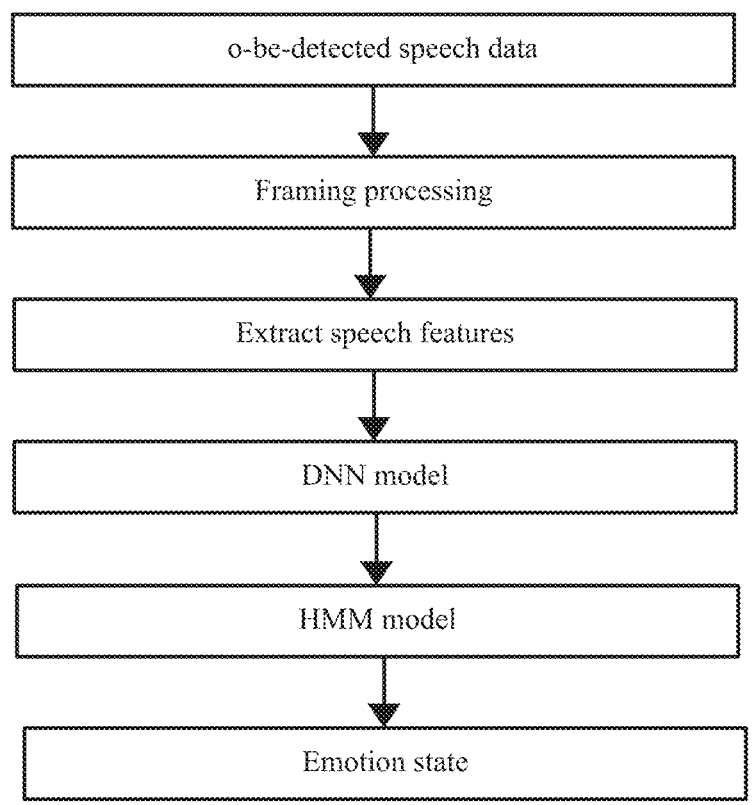
FIG. 11 is a schematic flowchart of performing emotion prediction on to-be-detected speech data in another embodiment.

FIG. 11 is a schematic flowchart of performing emotion state prediction on to-be-detected speech data in an embodiment. First, to-be-detected speech data is obtained, then framing processing is performed on the obtained speech data to obtain speech frames, then speech features corresponding to the speech frames are extracted, the speech features corresponding to the speech frames are used as an input of an RNN model (emotion state probability detection model), and emotion state probabilities corresponding to the speech frames are output. Then, the emotion state probabilities and the speech features are used as an input of an HMM model (emotion state transition model) to obtain an output emotion state sequence, and an emotion corresponding to the to-be-detected speech data is determined according to the emotion state sequence.

Figure 12:
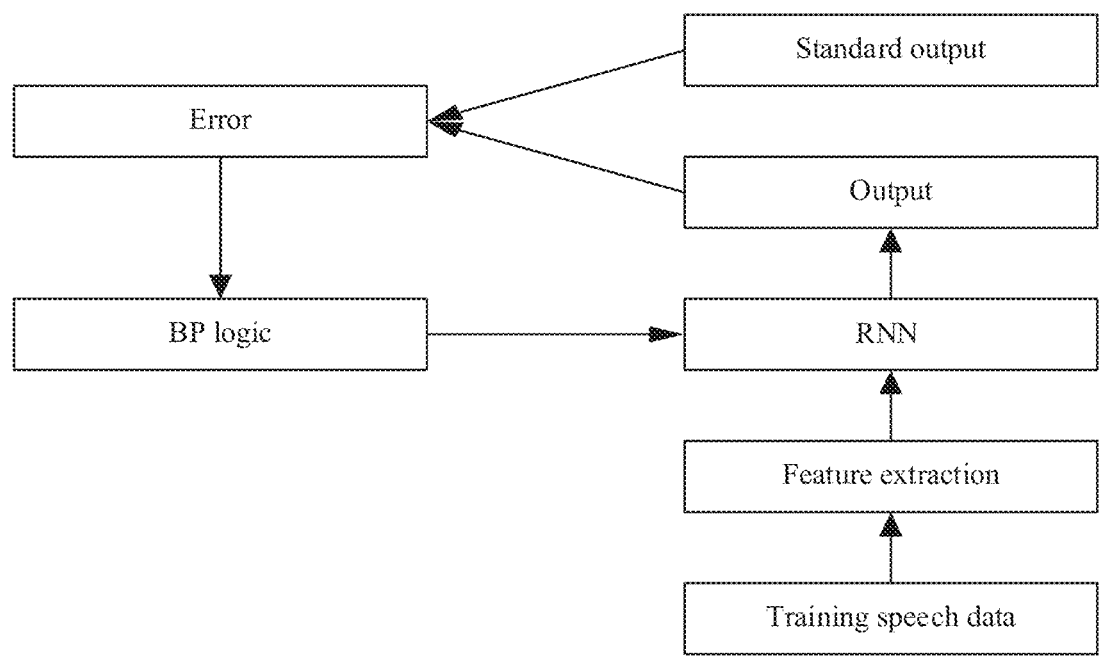
FIG. 12 is a schematic flowchart of obtaining an emotion state detection model through training by using a recurrent neural network (RNN) model in an embodiment.

In an embodiment, before the step of inputting the speech feature matrix to a trained emotion state probability detection model, and outputting an emotion state probability matrix corresponding to the to-be-detected speech data, the method further includes: obtaining an emotion state probability detection model through training by using the RNN model. FIG. 12 is a schematic flowchart of obtaining an emotion state probability detection model through training by using an RNN model.

A specific training process is as follows: (1) Perform framing on training speech data. The training speech data is obtained, and framing processing is performed on the training speech data to obtain speech frames. (2) Extract speech features corresponding to the speech frames. The extracted features may be an integration of a plurality of types of features, for example, an integration of a plurality of features such as PLP, MFCC, PITCH, and ENERGY. (3) Input a speech feature to the RNN model for training. The speech frames are transferred forward from an input layer, and reaches an output layer after passing through hidden layers. A rule of transmitting information between layers in the RNN may be represented as the following forms:

$$a_h^t = \sum_{i=1}^{I} w_{ih} x_i^t + \sum_{h'=1}^{H} w_{h'h} b_{h'}^{t-1},$$

and $b_h^t = f(a_h^t)$; where $a_h^t$ is a value of a unit at a current layer h at t moment, I is a total quantity of previous layer neuron nodes, that is, a total quantity of the current layer input parameters, H is a total quantity of neuron nodes in the current layer, $w_{ih}$ is a weight from unit i to unit h, $w_{h'h}$ is a weight from unit h' to unit h, and $b_{h'}^{t-1}$ represents an output of the current layer at the previous moment. $b_h^t$ is a value after an excitation function (non-linear mapping) is performed on $a_h^t$. (5) Obtain an output emotion state prediction probability corresponding to a speech feature, compare the emotion state prediction probability with a standard emotion state probability, and compute whether an error therebetween is within a preset range. If the error is within the preset, it indicates that the current DNN model may be used for subsequent prediction, and if the error is not within the preset range, enter step (6) to adjust the model by continuously updating weights. (6) Update weights. Specifically, a suitable loss function is selected according to an actual output and a standard output. Usually, a maximum entropy and minimum mean square error function are used as loss functions, and then, a weight and a deviation of the DNN model are updated by using a stochastic gradient descent method. After a plurality of rounds of iterations, the model attains to the optimum. The specific computation is as follows: first $$\delta_j^t \stackrel{def}{=} \frac{\partial O}{\partial a_j^t}$$

is defined, where $a_j^t$ is a value of a unit at a current layer J at t moment, and O represents a target function. It is assumed that a cross-entropy is defined as a function:

$$O = -\sum_{k=1}^{K} z_k \log y_k,$$

where $z_k$ is a standard output value, namely, an actual label of a training set; K is a quantity of types of data, where assuming that there are four types of emotion states, correspondingly K=4; and $y_k$ is the last output transferred forward, where generally, a common excitation function of an output layer is softmax, and therefore $y_k$ may be defined as:

$$y_k = \exp(a_k) / \sum_{k'=1}^{K} \exp(a_{k'}).$$

After derivation of a series of data, an output layer: $\delta_k = y_k - z_k$ may be finally obtained. For an intermediate layer:

$$\delta_h^t = f'(a_h^t) \left( \sum_{k=1}^{K} \delta_k^t w_{hk} + \sum_{h'=1}^{H} \delta_{h'}^{t+1} w_{hh'} \right),$$

where $w_{ij}$ is a weight from unit i to unit j, beginning from the last t=T of a complete δ sequence, the value of t is reduced gradually, and δ at each moment is updated. Therefore, the gradient of the weight at each layer is:

$$\frac{\partial O}{\partial w_{ij}} = \sum_{t=1}^{T} \frac{\partial O}{\partial a_j^t} \frac{\partial a_j^t}{\partial w_{ij}} = \sum_{t=1}^{T} \delta_j^t b_i^t;$$

and the weight is updated as:

$$w_{ij}^{t+1} = w_{ij}^t - \eta \frac{\partial O}{\partial w_{ij}^{t+1}},$$

where η represents a learning rate. At this point, the RNN training process is completed. After a plurality of rounds of forward and backward iterations, the RNN model is gradually optimized to attain to the optimum gradually.

Figure 13:
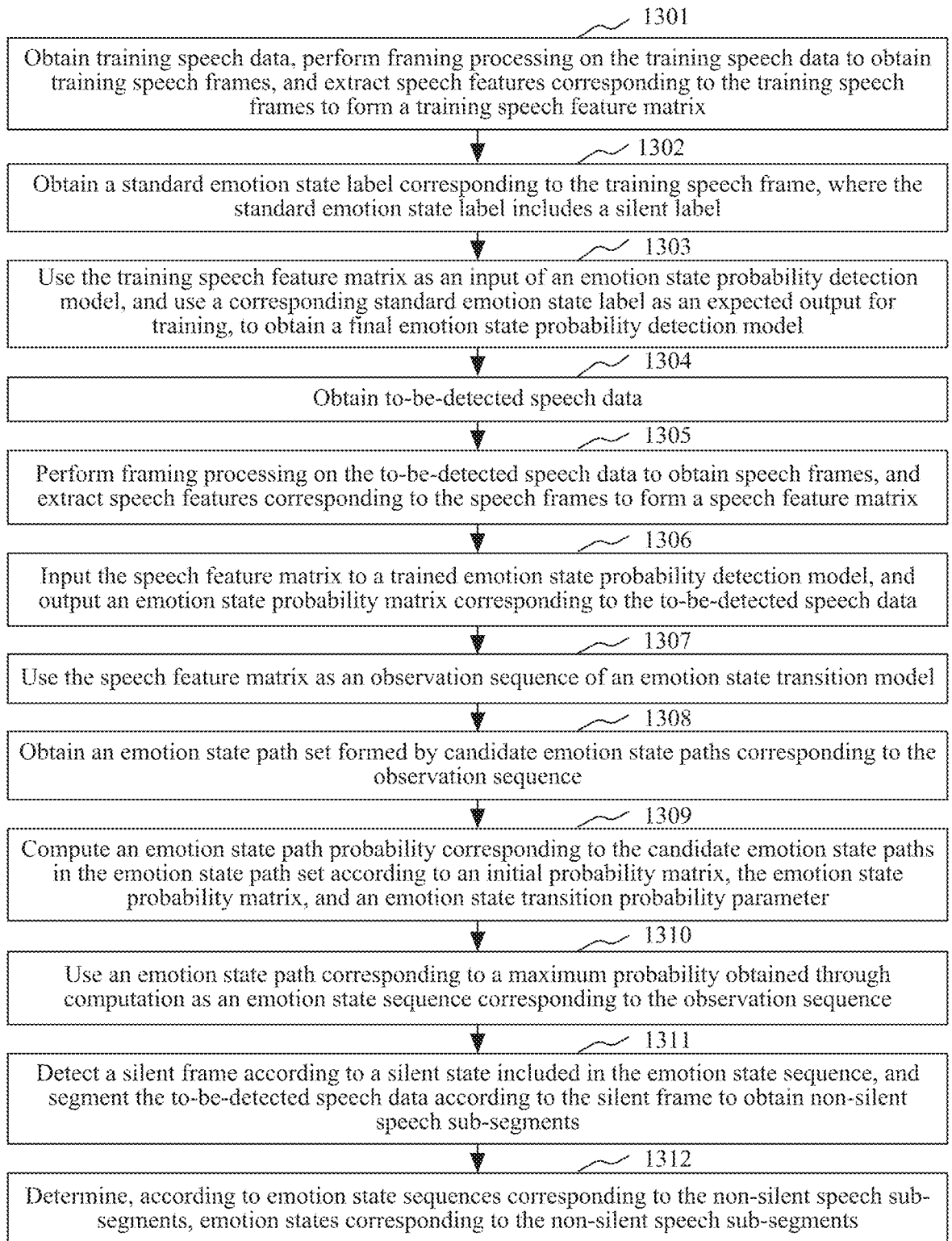
FIG. 13 is a flowchart of a speech emotion detection method in another embodiment.

As shown in FIG. 13, a speech emotion detection method is provided, and the method includes the following steps:

Step 1301. Obtain training speech data, perform framing processing on the training speech data to obtain training speech frames, and extract speech features corresponding to the training speech frames to form a training speech feature matrix.

Step 1302. Obtain a standard emotion state label corresponding to the training speech frame, where the standard emotion state label includes a silent label.

Step 1303. Use the training speech feature matrix as an input of an emotion state probability detection model, and use a corresponding standard emotion state label as an expected output for training, to obtain a final emotion state probability detection model.

Step 1304. Obtain to-be-detected speech data.

Step 1305. Perform framing processing on the to-be-detected speech data to obtain speech frames, and extract speech features corresponding to the speech frames to form a speech feature matrix.

Step 1306. Input the speech feature matrix to a trained emotion state probability detection model, and output an emotion state probability matrix corresponding to the to-be-detected speech data.

Step 1307. Use the speech feature matrix as an observation sequence of an emotion state transition model.

Step 1308. Obtain an emotion state path set formed by candidate emotion state paths corresponding to the observation sequence.

Step 1309. Compute an emotion state path probability corresponding to the candidate emotion state paths in the emotion state path set according to an initial probability matrix, the emotion state probability matrix, and an emotion state transition probability parameter.

Step 1310. Use an emotion state path corresponding to a maximum probability obtained through computation as an emotion state sequence corresponding to the observation sequence.

Step 1311. Detect a silent frame according to a silent state included in the emotion state sequence, and segment the to-be-detected speech data according to the silent frame to obtain non-silent speech sub-segments.

Step 1312. Determine, according to emotion state sequences corresponding to the non-silent speech sub-segments, emotion states corresponding to the non-silent speech sub-segments.

Figure 14:
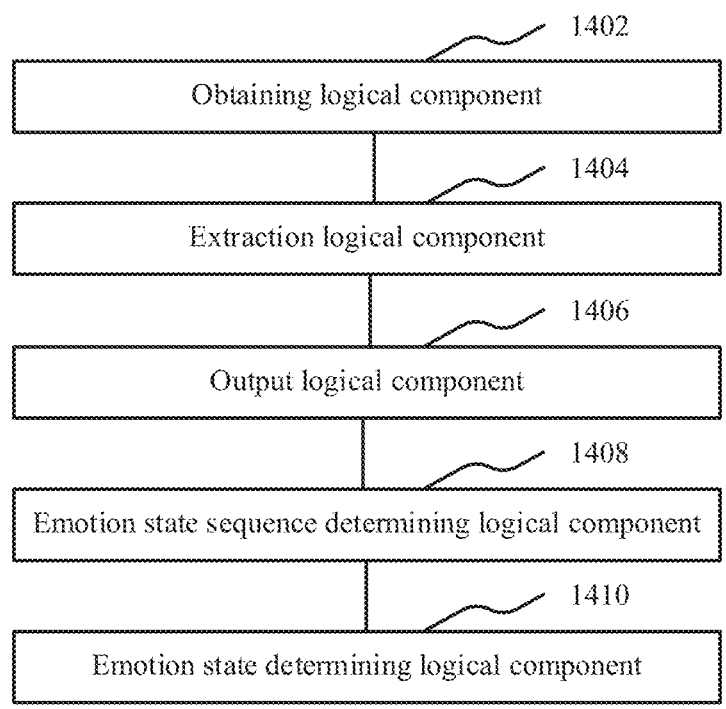
FIG. 14 is a structural block diagram of a speech emotion detection apparatus in an embodiment.

As shown in FIG. 14, in an embodiment, a speech emotion detection apparatus is provided, and the apparatus includes:

an obtaining logical component 1402, configured to obtain to-be-detected speech data;

an extraction logical component 1404, configured to perform framing processing on the to-be-detected speech data to obtain speech frames, and extract speech features corresponding to the speech frames, to form a speech feature matrix corresponding to the to-be-detected speech data;

an output logical component 1406, configured to input the speech feature matrix to a trained emotion state probability detection model, and output an emotion state probability matrix corresponding to the to-be-detected speech data;

an emotion state sequence determining logical component 1408, configured to input the emotion state probability matrix and the speech feature matrix to a trained emotion state transition model to obtain an emotion state sequence corresponding to the to-be-detected speech data; and an emotion state determining logical component 1410, configured to determine, according to the emotion state sequence, an emotion state corresponding to the to-be-detected speech data.

In an embodiment, the trained emotion state transition model includes a trained emotion state transition probability parameter; and the emotion state sequence determining logical component 1408 is further configured to: use the speech feature matrix as an observation sequence of the emotion state transition model; and obtain an initial probability matrix, and determine, according to the initial probability matrix, the emotion state probability matrix, and the emotion state transition probability parameter, an emotion state sequence corresponding to the observation sequence, where the emotion state transition probability parameter represents a probability of transition between emotion states.

In an embodiment, the emotion state sequence determining logical component 1408 is further configured to: obtain an emotion state path set formed by candidate emotion state paths corresponding to the observation sequence; compute emotion state path probabilities corresponding to the candidate emotion state paths in the emotion state path set according to the initial probability matrix, the emotion state probability matrix, and the emotion state transition probability parameter; and use an emotion state path corresponding to a maximum probability obtained through computation as the emotion state sequence corresponding to the observation sequence.

In an embodiment, the emotion state probability includes a silent probability; and the emotion state determining logical component 1410 is further configured to: detect a silent frame in the to-be-detected speech data according to a silent state included in the emotion state sequence, and segment the to-be-detected speech data according to the silent frame, to obtain non-silent speech sub-segments; and determine, according to emotion state sequences corresponding to the non-silent speech sub-segments, emotion states corresponding to the non-silent speech sub-segments.

Figure 15:
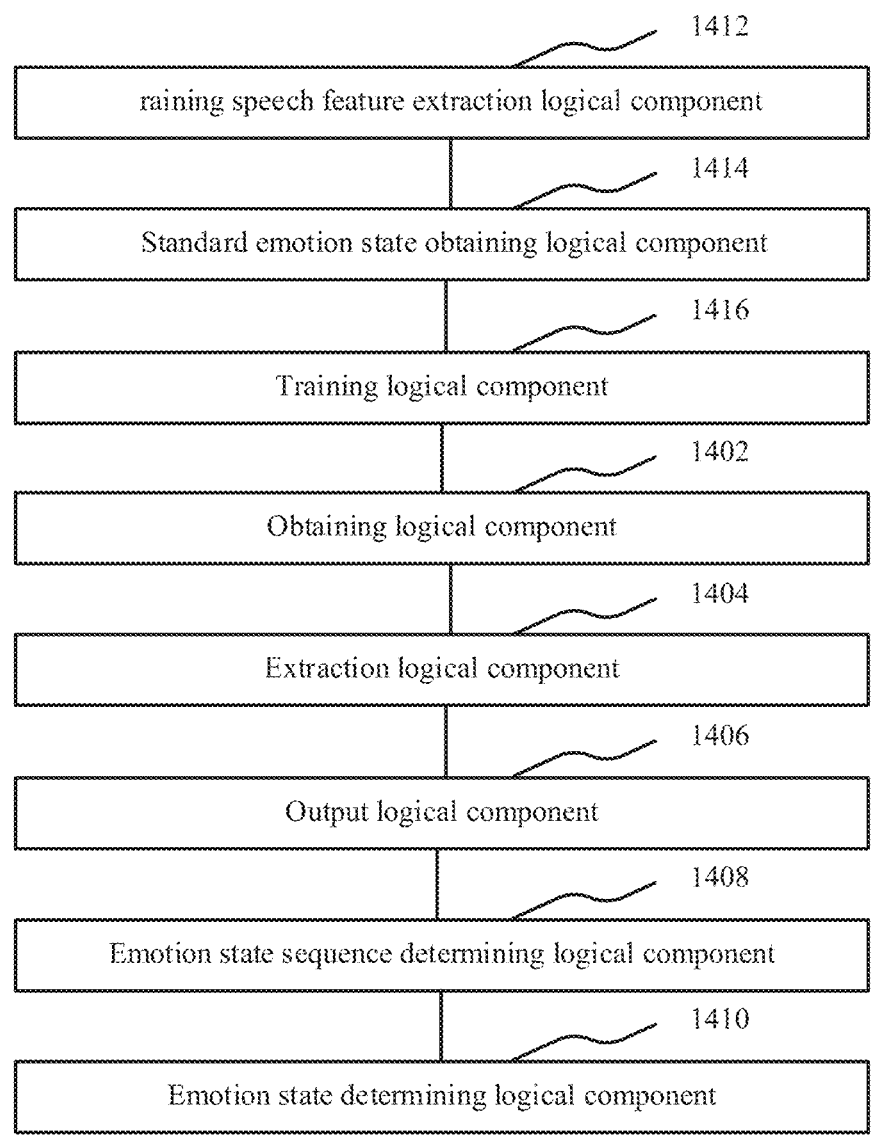
FIG. 15 is a structural block diagram of a speech emotion detection apparatus in another embodiment.

As shown in FIG. 15, in an embodiment, the speech emotion state detection apparatus further includes:

a training speech feature extraction logical component 1412, configured to obtain training speech data, perform framing processing on the training speech data to obtain training speech frames, and extract speech features corresponding to the training speech frames to form a training speech feature matrix;

a standard emotion state obtaining logical component 1414, configured to obtain a standard emotion state label corresponding to the training speech frame, where the standard emotion state label includes a silent label; and a training logical component 1416, configured to use the training speech feature matrix as an input of the emotion state probability detection model, and use standard emotion state labels corresponding to all speech feature in the training speech feature matrix as an expected output of the emotion state probability detection model; and complete training for the emotion state probability detection model when an error between an emotion state actually output by the emotion state probability detection model and the standard emotion state label meets a preset condition, to obtain the emotion state probability detection model.

In an embodiment, the extraction logical component is further configured to: perform framing processing on the to-be-detected speech data to obtain speech frames; obtain a current speech frame, and obtain an extended speech frame corresponding to the current speech frame; extract a current speech feature corresponding to the current speech frame, and extract an extended speech feature corresponding to the extended speech frame; generate, according to the current speech feature and the extended speech feature, an extended speech feature vector corresponding to the current speech frame; and form, according to extended speech feature vectors corresponding to the speech frames, a speech feature matrix corresponding to the to-be-detected speech data.

In an embodiment, the emotion state probability detection model is obtained through training by using a DNN model; and the output logical component is further configured to: obtain an input layer node sequence according to the speech feature matrix, project the input layer node sequence to obtain a hidden layer node sequence corresponding to a first hidden layer, and use the first hidden layer as a current processing hidden layer; and use non-linear mapping according to the hidden layer node sequence corresponding to the current processing hidden layer and weights and deviations of neuron nodes corresponding to the current processing hidden layer, to obtain a hidden layer node sequence of a next hidden layer, use the next hidden layer as the current processing hidden layer, repeat entering the step of using non-linear mapping according to the hidden layer node sequence corresponding to the current processing hidden layer and weights and deviations corresponding to neuron nodes corresponding to the current processing hidden layer, to obtain a hidden layer node sequence of a next hidden layer, until an output layer is reached, and obtain an emotion state probability matrix that corresponds to the to-be-detected speech data and that is output by the output layer.

In an embodiment, the emotion state probability detection model is obtained through training by using an RNN model; and the output logical component is further configured to: obtain an input layer node sequence according to the speech feature matrix, project the input layer node sequence to obtain a hidden layer node sequence corresponding to a first hidden layer, and use the first hidden layer as a current processing hidden layer; and use non-linear mapping according to the hidden layer node sequence corresponding to the current processing hidden layer, weights of neuron nodes corresponding to the current processing hidden layer, and an output of the current processing hidden layer at a previous moment, to obtain a hidden layer node sequence of a next hidden layer, use the next hidden layer as a current processing hidden layer, repeat entering the step of using non-linear mapping according to the hidden layer node sequence corresponding to the current processing hidden layer, weights of neuron nodes corresponding to the current processing hidden layer, and an output of the current processing hidden layer at a previous moment, to obtain a hidden layer node sequence of a next hidden layer, until an output layer is reached, and obtain an emotion state probability matrix that corresponds to the to-be-detected speech data and that is output by the output layer.

Figure 16:
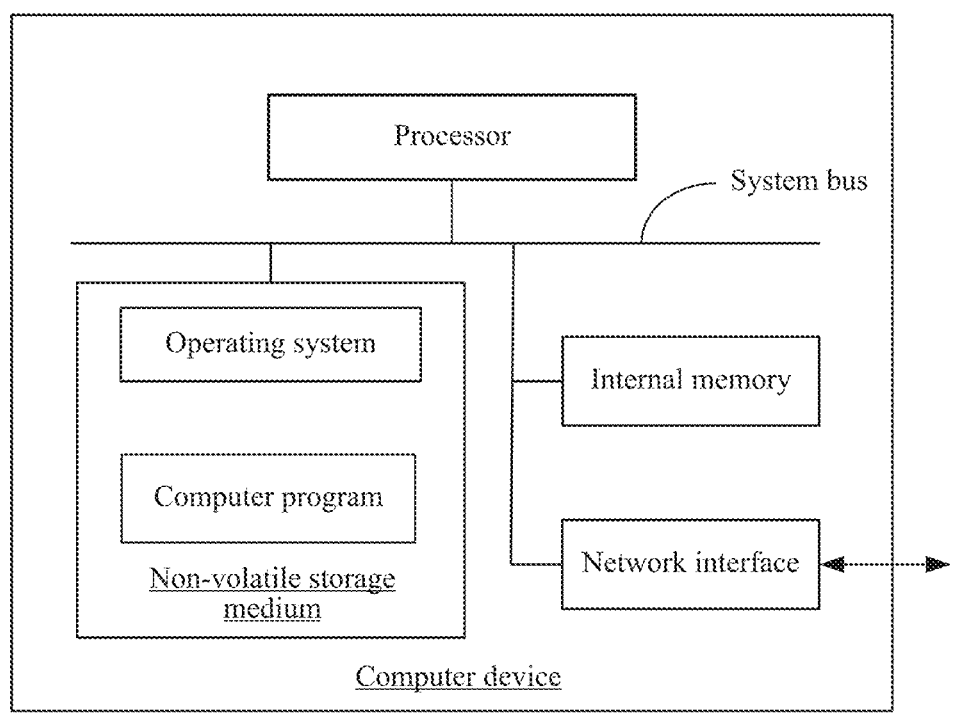
FIG. 16 is a schematic diagram of an internal structure of a computer device in an embodiment.

FIG. 16 is a schematic diagram of an internal structure of a computer device in an embodiment. The computer device may be a terminal or a server. The terminal may be an electronic device having a communications function, such as a smartphone, a tablet computer, a notebook computer, a desktop computer, a personal digital assistant, a wearable device, or an in-vehicle device. The server may be an independent server or a server cluster. Referring to FIG. 16, the computer device includes a processor, a non-volatile storage medium, an internal memory, and a network interface that are connected to each other by using a system bus. The non-volatile storage medium of the computer device may store an operating system and a computer program, and when executed, the computer program may cause the processor to perform a speech emotion detection method. The processor of the computer device is configured to provide computing and control capabilities to support running of the entire computer device. The internal memory may store a computer program, and when executed by the processor, the computer program may cause the processor to perform a speech emotion detection method. The network interface of the computer device is configured to perform network communication. A person skilled in the art may understand that, the structure shown in FIG. 16 is merely a block diagram of a partial structure related to a solution in this application, and does not constitute a limitation to the computer device to which the solution in this application is applied. Specifically, the computer device may include more components or fewer components than those shown in the figure, or some components may be combined, or a different component deployment may be used.

In an embodiment, the speech emotion detection apparatus provided in this application may be implemented as a form of a computer program. The computer program may be run in the computer device shown in FIG. 16. The non-volatile storage medium of the computer device may store the program logical components forming the speech emotion detection apparatus, for example, the obtaining logical component 1402, the extraction logical component 1404, the output logical component 1406, the emotion state sequence determining logical component 1408, and the emotion state determining logical component 1410 in FIG. 14. The program logical components may cause the computer device to perform the steps in the speech emotion detection method of the embodiments of this application described in this specification. The processor of the computer device can invoke the program logical components of the speech emotion detection apparatus that are stored in the non-volatile storage medium of the computer device, to run corresponding readable instructions, to implement the functions corresponding to the logical components of the speech emotion detection apparatus in this specification. For example, the computer device may obtain to-be-detected speech data by using the obtaining logical component 1402 in the speech emotion detection apparatus shown in FIG. 14; perform framing processing on the to-be-detected speech data to obtain speech frames, and extract speech features corresponding to the speech frames to form a speech feature matrix by using the extraction logical component 1404; input the speech feature matrix to a trained emotion state probability detection model, and output an emotion state probability matrix corresponding to the to-be-detected speech data by using the output logical component 1406; input the emotion state probability matrix and the speech feature matrix to a trained emotion state transition model, to obtain a corresponding emotion state sequence by using the emotion state sequence determining logical component 1408, where the trained emotion state transition model includes a trained emotion state transition probability parameter; and determine according to the emotion state sequence, an emotion state corresponding to the to-be-detected speech data by using the emotion state determining logical component 1410.

In an embodiment, a computer device is provided, including a memory and a processor. The memory stores a computer program comprising computer executable instructions, and when executed by the processor, the computer program causes the processor to perform the following steps: obtaining to-be-detected speech data; performing framing processing on the to-be-detected speech data to obtain speech frames, and extracting speech features corresponding to the speech frames to form a speech feature matrix; inputting the speech feature matrix to a trained emotion state probability detection model, and outputting an emotion state probability matrix corresponding to the to-be-detected speech data; inputting the emotion state probability matrix and the speech feature matrix to a trained emotion state transition model to obtain a corresponding emotion state sequence, where the trained emotion state transition model includes a trained emotion state transition probability parameter; and determining, according to the emotion state sequence, an emotion state corresponding to the to-be-detected speech data.

In an embodiment, the step of inputting the emotion state probability matrix and the speech feature matrix to a trained emotion state transition model to obtain a corresponding emotion state sequence, where the trained emotion state transition model includes a trained emotion state transition probability parameter includes: using the speech feature matrix as an observation sequence of the emotion state transition model; and obtaining an initial probability matrix, and determining, according to the initial probability matrix, the emotion state probability matrix, and the emotion state transition probability parameter, an emotion state sequence corresponding to the observation sequence.

In an embodiment, the step of obtaining an initial probability matrix, and determining, according to the initial probability matrix, the emotion state probability matrix, and the emotion state transition probability parameter, an emotion state sequence corresponding to the observation sequence includes: obtaining an emotion state path set formed by candidate emotion state paths corresponding to the observation sequence; computing emotion state path probabilities corresponding to the candidate emotion state paths in the emotion state path set according to the initial probability matrix, the emotion state probability matrix, and the emotion state transition probability parameter; and using an emotion state path corresponding to a maximum probability obtained computation as the emotion state sequence corresponding to the observation sequence.

In an embodiment, the emotion state probability includes a silent probability; and the step of determining, according to the emotion state sequence, an emotion state corresponding to the to-be-detected speech data includes: detecting a silent frame according to a silent state included in the emotion state sequence, and segmenting the to-be-detected speech data according to the silent frame, to obtain non-silent speech sub-segments; and determining, according to emotion state sequences corresponding to the non-silent speech sub-segments, emotion states corresponding to the non-silent speech sub-segments.

In an embodiment, before performing the step of inputting the speech feature matrix to a trained emotion state probability detection model, and outputting an emotion state probability matrix corresponding to the to-be-detected speech data, the processor is further configured to perform the following steps: obtaining training speech data, performing framing processing on the training speech data to obtain training speech frames, and extracting speech features corresponding to the training speech frames to form a training speech feature matrix; obtaining a standard emotion state label corresponding to the training speech frame, where the standard emotion state label includes a silent label; and using the training speech feature matrix as an input of the emotion detection model, training a corresponding standard emotion state label as an expected output, and obtaining a target emotion detection model.

In an embodiment, the step of performing framing processing on the to-be-detected speech data to obtain speech frames, and extracting speech features corresponding to the speech frames to form a speech feature matrix includes: performing framing processing on the to-be-detected speech data to obtain speech frames; obtaining a current speech frame, and obtaining an extended speech frame corresponding to the current speech frame; extracting a current speech feature corresponding to the current speech frame, and extracting an extended speech feature corresponding to the extended speech frame; generating, according to the current speech feature and the extended speech feature, an extended speech feature vector corresponding to the current speech frame; and forming, according to extended speech feature vectors corresponding to the speech frames, a speech feature matrix corresponding to the to-be-detected speech data.

In an embodiment, the emotion state detection model is obtained through training by using a DNN model; and the step of inputting the speech feature matrix to a trained emotion state probability detection model, and outputting an emotion state probability matrix corresponding to the to-be-detected speech data includes: obtaining an input layer node sequence according to the speech feature matrix, projecting the input layer node sequence to obtain a hidden layer node sequence corresponding to a first hidden layer, and using the first hidden layer as a current processing hidden layer; and using non-linear mapping according to the hidden layer node sequence corresponding to the current processing hidden layer and weights and deviations of neuron nodes corresponding to the current processing hidden layer, to obtain a hidden layer node sequence of a next hidden layer, using the next hidden layer as the current processing hidden layer, repeating entering the step of using non-linear mapping according to the hidden layer node sequence corresponding to the current processing hidden layer and weights and deviations corresponding to neuron nodes corresponding to the current processing hidden layer, to obtain a hidden layer node sequence of a next hidden layer, until reaching an output layer, and obtaining an emotion state probability matrix that corresponds to the to-be-detected speech data and that is output by the output layer.

In an embodiment, the emotion state detection model is obtained through training by using an RNN model; and the step of inputting the speech feature matrix to a trained emotion state probability detection model, and outputting an emotion state probability matrix corresponding to the to-be-detected speech data includes: obtaining an input layer node sequence according to the speech feature matrix, projecting the input layer node sequence to obtain a hidden layer node sequence corresponding to a first hidden layer, and using the first hidden layer as a current processing hidden layer; and using non-linear mapping according to the hidden layer node sequence corresponding to the current processing hidden layer, weights of neuron nodes corresponding to the current processing hidden layer, and an output of the current processing hidden layer at a previous moment, to obtain a hidden layer node sequence of a next hidden layer, using the next hidden layer as a current processing hidden layer, repeating entering the step of using non-linear mapping according to the hidden layer node sequence corresponding to the current processing hidden layer, weights of neuron nodes corresponding to the current processing hidden layer, and an output of the current processing hidden layer at a previous moment, to obtain a hidden layer node sequence of a next hidden layer, until reaching an output layer, and obtaining an emotion state probability matrix that corresponds to the to-be-detected speech data and that is output by the output layer.

In an embodiment, a computer-readable storage medium storing a computer program is provided. When executed by a processor, the program implements the following steps: obtaining to-be-detected speech data; performing framing processing on the to-be-detected speech data to obtain speech frames, and extracting speech features corresponding to the speech frames to form a speech feature matrix; inputting the speech feature matrix to a trained emotion state probability detection model, and outputting an emotion state probability matrix corresponding to the to-be-detected speech data; inputting the emotion state probability matrix and the speech feature matrix to a trained emotion state transition model to obtain a corresponding emotion state sequence, where the trained emotion state transition model includes a trained emotion state transition probability parameter; and determining, according to the emotion state sequence, an emotion state corresponding to the to-be-detected speech data.

In an embodiment, the step of inputting the emotion state probability matrix and the speech feature matrix to a trained emotion state transition model to obtain a corresponding emotion state sequence, where the trained emotion state transition model includes a trained emotion state transition probability parameter includes: using the speech feature matrix as an observation sequence of the emotion state transition model; and obtaining an initial probability matrix, and determining, according to the initial probability matrix, the emotion state probability matrix, and the emotion state transition probability parameter, an emotion state sequence corresponding to the observation sequence.

In an embodiment, the step of obtaining an initial probability matrix, and determining, according to the initial probability matrix, the emotion state probability matrix, and the emotion state transition probability parameter, an emotion state sequence corresponding to the observation sequence includes: obtaining an emotion state path set formed by candidate emotion state paths corresponding to the observation sequence; computing emotion state path probabilities corresponding to the candidate emotion state paths in the emotion state path set according to the initial probability matrix, the emotion state probability matrix, and the emotion state transition probability parameter; and using an emotion state path corresponding to a maximum probability obtained computation as the emotion state sequence corresponding to the observation sequence.

In an embodiment, the emotion state probability includes a silent probability; and the step of determining, according to the emotion state sequence, an emotion state corresponding to the to-be-detected speech data includes: detecting a silent frame according to a silent state included in the emotion state sequence, and segmenting the to-be-detected speech data according to the silent frame, to obtain non-silent speech sub-segments; and determining, according to emotion state sequences corresponding to the non-silent speech sub-segments, emotion states corresponding to the non-silent speech sub-segments.

In an embodiment, before performing the step of inputting the speech feature matrix to a trained emotion state probability detection model, and outputting an emotion state probability matrix corresponding to the to-be-detected speech data, the processor is further configured to perform the following steps: obtaining training speech data, performing framing processing on the training speech data to obtain training speech frames, and extracting speech features corresponding to the training speech frames to form a training speech feature matrix; obtaining a standard emotion state label corresponding to the training speech frame, where the standard emotion state label includes a silent label; and using the training speech feature matrix as an input of the emotion detection model, training a corresponding standard emotion state label as an expected output, and obtaining a target emotion detection model.

In an embodiment, the step of performing framing processing on the to-be-detected speech data to obtain speech frames, and extracting speech features corresponding to the speech frames to form a speech feature matrix includes: performing framing processing on the to-be-detected speech data to obtain speech frames; obtaining a current speech frame, and obtaining an extended speech frame corresponding to the current speech frame; extracting a current speech feature corresponding to the current speech frame, and extracting an extended speech feature corresponding to the extended speech frame; generating, according to the current speech feature and the extended speech feature, an extended speech feature vector corresponding to the current speech frame; and forming, according to extended speech feature vectors corresponding to the speech frames, a speech feature matrix corresponding to the to-be-detected speech data.

In an embodiment, the emotion state detection model is obtained through training by using a DNN model; and the step of inputting the speech feature matrix to a trained emotion state probability detection model, and outputting an emotion state probability matrix corresponding to the to-be-detected speech data includes: obtaining an input layer node sequence according to the speech feature matrix, projecting the input layer node sequence to obtain a hidden layer node sequence corresponding to a first hidden layer, and using the first hidden layer as a current processing hidden layer; and using non-linear mapping according to the hidden layer node sequence corresponding to the current processing hidden layer and weights and deviations of neuron nodes corresponding to the current processing hidden layer, to obtain a hidden layer node sequence of a next hidden layer, using the next hidden layer as the current processing hidden layer, repeating entering the step of using non-linear mapping according to the hidden layer node sequence corresponding to the current processing hidden layer and weights and deviations corresponding to neuron nodes corresponding to the current processing hidden layer, to obtain a hidden layer node sequence of a next hidden layer, until reaching an output layer, and obtaining an emotion state probability matrix that corresponds to the to-be-detected speech data and that is output by the output layer.

In an embodiment, the emotion state detection model is obtained through training by using an RNN model; and the step of inputting the speech feature matrix to a trained emotion state probability detection model, and outputting an emotion state probability matrix corresponding to the to-be-detected speech data includes: obtaining an input layer node sequence according to the speech feature matrix, projecting the input layer node sequence to obtain a hidden layer node sequence corresponding to a first hidden layer, and using the first hidden layer as a current processing hidden layer; and using non-linear mapping according to the hidden layer node sequence corresponding to the current processing hidden layer, weights of neuron nodes corresponding to the current processing hidden layer, and an output of the current processing hidden layer at a previous moment, to obtain a hidden layer node sequence of a next hidden layer, using the next hidden layer as a current processing hidden layer, repeating entering the step of using non-linear mapping according to the hidden layer node sequence corresponding to the current processing hidden layer, weights of neuron nodes corresponding to the current processing hidden layer, and an output of the current processing hidden layer at a previous moment, to obtain a hidden layer node sequence of a next hidden layer, until reaching an output layer, and obtaining an emotion state probability matrix that corresponds to the to-be-detected speech data and that is output by the output layer.

A person of ordinary skill in the art may understand that all or some of the procedures of the methods of the foregoing embodiments may be implemented by a computer program instructing relevant hardware. The computer program may be stored in a computer-readable storage medium. When the program is executed, the program may include the procedures of the embodiments of the foregoing methods. The storage medium may be a non-transitory computer readable storage medium such as a magnetic disk, an optical disc, or a read-only memory (ROM), or may be a random access memory (RAM) or the like.

In some examples, the units, subunits, and/or logic described herein may be referred to as a logical component. Each logical component may be hardware or a combination of hardware and software. For example, each logical component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each logical component may include memory hardware, such as a portion of the memory, for example, that comprises instructions executable with the processor or other processors to implement one or more of the features of the logical components. When any one of the logical components includes the portion of the memory that comprises instructions executable with the processor, the logical component may or may not include the processor. In some examples, each logical components may just be the portion of the memory or other physical memory that comprises instructions executable with the processor or other processor to implement the features of the corresponding logical component without the logical component including any other hardware. Because each logical component includes at least some hardware even when the included hardware comprises software, each logical component may be interchangeably referred to as a hardware logical component.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

While various embodiments have been described, it will be apparent to those of ordinary skill in the art that many more embodiments and implementations are possible. Accordingly, the embodiments described herein are examples, not the only possible embodiments and implementations.

What is claimed is:

1. A speech emotion detection method performed by a device, comprising:
    extracting speech features of to-be-detected speech data to form a speech feature matrix corresponding to the to-be-detected speech data;
    inputting the speech feature matrix to an emotion state probability detection model, the emotion state probability detection model being trained based on a recurrent neural network (RNN) model;
    based on the speech feature matrix and the RNN model, generating an emotion state probability matrix corresponding to the to-be-detected speech data, the emotion state probability matrix comprising a silent probability which is a probability of a pause in the to-be-detected speech data;

generating, based on the emotion state probability matrix, the speech feature matrix, and an emotion state transition model, an emotion state sequence corresponding to the to-be-detected speech data, the emotion state sequence comprising at least one silent state, wherein a detection of the at least one silent state does not rely on a mechanism that is based on a power of the to-be-detected speech data;

detecting M successive silent frames according to the at least one silent state in the emotion state sequence, M being an integer;

in a determination that M is greater than a predefined threshold, segmenting the to-be-detected speech data according to the M successive silent frames to obtain non-silent speech sub-segments; and determining, based on the emotion state sub-sequences corresponding to the non-silent speech sub-segments, emotion states corresponding to the to-be-detected speech data.

2. The method of claim 1, wherein generating the emotion state probability matrix corresponding to the to-be-detected speech data comprises:

obtaining an input layer node sequence according to the speech feature matrix;

projecting the input layer node sequence to obtain a hidden layer node sequence for a first hidden layer; and obtaining a hidden layer node sequence for a next hidden layer;

successively obtaining, until identifying an output layer, hidden layer node sequences for subsequent hidden layers, respectively; and obtaining an emotion state probability matrix that corresponds to the to-be-detected speech data and that is output by the output layer.

3. The method of claim 1, wherein determining, based on the emotion state sequence, the emotion state corresponding to the to-be-detected speech data further comprises:

extracting non-silent speech sub-segments from silent frames of the to-be-detected speech data; and determining, based on the emotion state sequence corresponding to the non-silent speech sub-segments, emotion states corresponding to the non-silent speech sub-segments.

4. The method of claim 3, wherein the emotion state sequence comprises a silent state, and wherein each of the silent frames corresponds to the silent state.

5. The method of claim 1, further comprising:

extracting training speech features corresponding to the training speech frames to form a training speech feature matrix;

obtaining standard emotion state labels corresponding to training speech frames;

training the emotion state probability detection model based on the training speech feature matrix being an input of the emotion state probability detection model and standard emotion state labels corresponding to the training speech features being a predetermined output of the emotion state probability detection model;

determining an error measurement satisfies a predetermined condition, the error measurement based on a probability for the emotion state and a predetermined probability for the standard emotion state labels; and completing training for the emotion state probability detection model in response to satisfaction of the predetermined condition.

6. The method of claim 1, wherein the emotion state transition model is trained by using a Hidden Markov Model (HMM) model.

7. A speech emotion detection system, comprising a hardware processor, the hardware processor configured to:

extracting speech features of to-be-detected speech data to form a speech feature matrix corresponding to the to-be-detected speech data;

input the speech feature matrix to an emotion state probability detection model, the emotion state probability detection model being trained based on a deep neural network (DNN) model;

generate an emotion state probability matrix that corresponds to the to-be-detected speech data using the DNN model, the emotion state probability matrix comprising a silent probability which is a probability of a pause in the to-be-detected speech data;

generate, based on the emotion state probability matrix, the speech feature matrix, and an emotion state transition model, an emotion state sequence corresponding to the to-be-detected speech data, the emotion state sequence comprising at least one silent state, wherein a detection of the at least one silent state does not rely on a mechanism that is based on a power of the to-be-detected speech data;

detect M successive silent frames according to the at least one silent state in the emotion state sequence, M being an integer;

in a determination that M is greater than a predefined threshold, segment the to-be-detected speech data according to the M successive silent frames to obtain non-silent speech sub-segments; and determine, based on the emotion state sub-sequences corresponding to the non-silent speech sub-segments, emotion states corresponding to the to-be-detected speech data.

8. The speech emotion detection system of claim 7, wherein to generate the emotion state probability matrix corresponding to the to-be-detected speech data, the hardware processor is further configured to:

obtain an input layer node sequence according to the speech feature matrix;

project the input layer node sequence to obtain a hidden layer node sequence for a first hidden layer;

obtain a hidden layer node sequence for a next hidden layer;

successively obtain, until identifying an output layer, hidden layer node sequences for subsequent hidden layers, respectively; and obtain an emotion state probability matrix that corresponds to the to-be-detected speech data and that is output by the output layer.

9. The speech emotion detection system of claim 7, wherein to determine, based on the emotion state sequence, an emotion state corresponding to the to-be-detected speech data, the hardware processor is further configured to:

extract non-silent speech sub-segments from silent frames of the to-be-detected speech data; and determine, based on the emotion state sequence corresponding to the non-silent speech sub-segments, emotion states corresponding to the non-silent speech sub-segments.

10. The speech emotion detection system of claim 9, wherein the emotion state sequence comprises a silent state, and wherein each of the silent frames corresponds to the silent state.

11. The speech emotion detection system of claim 7, wherein the hardware processor is further configured to:
extract training speech features corresponding to the training speech frames to form a training speech feature matrix;
obtain standard emotion state labels corresponding to training speech frames;
train the emotion state probability detection model based on the training speech feature matrix being an input of the emotion state probability detection model and standard emotion state labels corresponding to the training speech features being a predetermined output of the emotion state probability detection model;
determine an error measurement satisfies a predetermined condition, the error measurement based on a probability for the emotion state and a predetermined probability for the standard emotion state labels; and
complete training for the emotion state probability detection model in response to satisfaction of the predetermined condition.

12. The speech emotion detection system of claim 7, wherein the emotion state transition model is trained by using a Hidden Markov Model (HMM) model.

13. A non-transitory storage medium for storing computer readable instructions, the computer readable instructions, when executed by a processor in a device, causing the processor to:
extract speech features of to-be-detected speech data to form a speech feature matrix corresponding to the to-be-detected speech data;
input the speech feature matrix to an emotion state probability detection model, the emotion state probability detection model being trained based on a recurrent neural network (RNN) model;
based on the speech feature matrix and the RNN model, generate an emotion state probability matrix corresponding to the to-be-detected speech data, the emotion state probability matrix comprising a silent probability which is a probability of a pause in the to-be-detected speech data;
generate, based on the emotion state probability matrix, the speech feature matrix, and an emotion state transition model, an emotion state sequence corresponding to the to-be-detected speech data, the emotion state sequence comprising at least one silent state, wherein a detection of the at least one silent state does not rely on a mechanism that is based on a power of the to-be-detected speech data;
detect M successive silent frames according to the at least one silent state in the emotion state sequence, M being an integer;
in a determination that M is greater than a predefined threshold, segment the to-be-detected speech data according to the M successive silent frames to obtain non-silent speech sub-segments; and
determine, based on the emotion state sub-sequences corresponding to the non-silent speech sub-segments, emotion states corresponding to the to-be-detected speech data.

14. The non-transitory storage medium of claim 13, wherein, when the computer readable instructions cause the processor to generate the emotion state probability matrix corresponding to the to-be-detected speech data, the computer readable instructions cause the processor to:
obtain an input layer node sequence according to the speech feature matrix;
project the input layer node sequence to obtain a hidden layer node sequence for a first hidden layer; and
obtain a hidden layer node sequence for a next hidden layer;
successively obtain, until identifying an output layer, hidden layer node sequences for subsequent hidden layers, respectively; and
obtain an emotion state probability matrix that corresponds to the to-be-detected speech data and that is output by the output layer.

15. The non-transitory storage medium of claim 13, wherein, when the computer readable instructions cause the processor to determine, based on the emotion state sequence, the emotion state corresponding to the to-be-detected speech data, the computer readable instructions further cause the processor to:
extract non-silent speech sub-segments from silent frames of the to-be-detected speech data; and
determine, based on the emotion state sequence corresponding to the non-silent speech sub-segments, emotion states corresponding to the non-silent speech sub-segments.

16. The non-transitory storage medium of claim 15, wherein the emotion state sequence comprises a silent state, and wherein each of the silent frames corresponds to the silent state.

17. The non-transitory storage medium of claim 13, wherein the computer readable instructions further cause the processor to:
extract training speech features corresponding to the training speech frames to form a training speech feature matrix;
obtain standard emotion state labels corresponding to training speech frames;
train the emotion state probability detection model based on the training speech feature matrix being an input of the emotion state probability detection model and standard emotion state labels corresponding to the training speech features being a predetermined output of the emotion state probability detection model;
determine an error measurement satisfies a predetermined condition, the error measurement based on a probability for the emotion state and a predetermined probability for the standard emotion state labels; and
complete training for the emotion state probability detection model in response to satisfaction of the predetermined condition.

18. The non-transitory storage medium of claim 13, wherein the emotion state transition model is trained by using a Hidden Markov Model (HMM) model.

* * * * *